United States Patent
Ujiie et al.

(10) Patent No.: US 10,615,986 B2
(45) Date of Patent: Apr. 7, 2020

(54) AUTHENTICATION SYSTEM AND AUTHENTICATION METHOD

(71) Applicant: Panasonic Intellectual Property Management Co., Ltd., Osaka (JP)

(72) Inventors: Yoshihiro Ujiie, Osaka (JP); Motoji Ohmori, Osaka (JP); Natsume Matsuzaki, Osaka (JP); Hideki Matsushima, Osaka (JP); Tomoyuki Haga, Nara (JP); Manabu Maeda, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 14/930,086

(22) Filed: Nov. 2, 2015

(65) Prior Publication Data
US 2016/0072630 A1 Mar. 10, 2016

Related U.S. Application Data

(63) Continuation of application No. PCT/JP2014/005014, filed on Oct. 1, 2014.

(60) Provisional application No. 61/916,582, filed on Dec. 16, 2013.

(51) Int. Cl.
| | |
|---|---|
| *H04L 9/32* | (2006.01) |
| *G06F 21/44* | (2013.01) |
| *G06F 21/33* | (2013.01) |
| *H04L 29/06* | (2006.01) |

(52) U.S. Cl.
CPC ............ *H04L 9/3268* (2013.01); *G06F 21/33* (2013.01); *G06F 21/44* (2013.01); *H04L 63/0823* (2013.01)

(58) Field of Classification Search
CPC ... H04L 9/3268; H04L 63/0823; G06F 21/33; G06F 21/44
See application file for complete search history.

(56) References Cited

U.S. PATENT DOCUMENTS

| | | | |
|---|---|---|---|
| 7,430,606 B1 * | 9/2008 | Meandzija | H04L 63/0823 709/223 |
| 8,635,442 B2 * | 1/2014 | Agrawal | H04L 9/3268 713/155 |
| 9,490,986 B2 * | 11/2016 | Niemela | H04L 63/0823 |
| 2004/0243814 A1 * | 12/2004 | Nakano | G11B 20/00086 713/189 |

(Continued)

FOREIGN PATENT DOCUMENTS

WO WO-2013179534 A1 * 12/2013 ........... H04L 9/3268

OTHER PUBLICATIONS

International Search Report of PCT application No. PCT/JP2014/005014 dated Dec. 22, 2014.

(Continued)

*Primary Examiner* — Saleh Najjar
*Assistant Examiner* — Devin E Almeida
(74) *Attorney, Agent, or Firm* — Greenblum & Bernstein, P.L.C.

(57) ABSTRACT

A device in an authentication system acquires a certificate revocation list along with a control command from an operating terminal to the device. The device determines the validity of the controller to which the device connects, based on the certificate revocation list acquired along with the control command.

8 Claims, 37 Drawing Sheets

(56) References Cited

U.S. PATENT DOCUMENTS

| | | | |
|---|---|---|---|
| 2005/0021941 A1* | 1/2005 | Ohmori | G11B 20/00086 713/156 |
| 2005/0071631 A1* | 3/2005 | Langer | H04L 9/0833 713/156 |
| 2005/0210241 A1* | 9/2005 | Lee | G06F 21/10 713/158 |
| 2007/0220616 A1* | 9/2007 | Oh | G06F 21/10 726/30 |
| 2007/0263869 A1* | 11/2007 | Oh | G06F 21/10 380/255 |
| 2007/0294526 A1* | 12/2007 | Medvinsky | H04N 21/235 713/158 |
| 2008/0010451 A1* | 1/2008 | Holtzman | H04L 9/3228 713/158 |
| 2009/0031131 A1* | 1/2009 | Qiu | H04L 63/0442 713/172 |
| 2009/0113543 A1* | 4/2009 | Adams | G06F 21/33 726/18 |
| 2009/0187983 A1* | 7/2009 | Zerfos | H04L 63/0823 726/10 |
| 2009/0249062 A1* | 10/2009 | Thomas | H04L 63/0823 713/158 |
| 2010/0138652 A1* | 6/2010 | Sela | G06F 21/445 713/158 |
| 2012/0054487 A1* | 3/2012 | Sun | G06F 21/64 713/158 |
| 2014/0006788 A1* | 1/2014 | Ignatchenko | H04L 63/0428 713/175 |
| 2014/0129829 A1* | 5/2014 | Unagami | H04L 9/3268 713/158 |
| 2016/0142210 A1* | 5/2016 | Hoyer | H04L 9/3268 380/270 |

OTHER PUBLICATIONS

"Wi-Fi Certified Wi-Fi Protected Setup" Wi-Fi Alliance, Dec. 2010.
Atsuko Miyaji et al. "Information Security" Ohm-sha pp. 140-147, Oct. 25, 2003 (Partial Translation).
"Suite B Implementer's Guide to FIPS 186-3(ECDSA)" Feb. 3, 2010.
Elaine Barker et al., "Recommendation for Pair-Wise Key Establishment Schemes Using Discrete Logarithm Cryptography" NIST Special Publication 800-56A Revision 2.
D. Forsberg et al., "Protocol for Carrying Authentication for Network Access (PANA)", RFC5191, May 2008.

* cited by examiner

| DEVICE ID | CERTIFICATE ID |
|---|---|
| DEVICE ID1 | CERTIFICATE ID (M1) |
| DEVICE ID2 | CERTIFICATE ID (M2) |
| DEVICE ID3 | CERTIFICATE ID (M3) |
| ... | ... |

FIG. 7

| CONTROLLER ID | CERTIFICATE ID |
|---|---|
| CONTROLLER ID1 | CERTIFICATE ID (C1) |
| CONTROLLER ID2 | CERTIFICATE ID (C2) |
| . . . | . . . |

FIG. 9

| CONTROLLER ID | CONTROLLER CERTIFICATE ID | DEVICE ID | CERTIFICATE OF DEVICE | HISTORY INFORMATION |
|---|---|---|---|---|
| CONTROLLER ID1 | CERTIFICATE ID (C1) | DEVICE ID1 | CERTIFICATE ID (M1) | HISTORY INFORMATION 1 |
| | | DEVICE ID2 | CERTIFICATE ID (M2) | HISTORY INFORMATION 2 |
| | | DEVICE ID3 | CERTIFICATE ID (M3) | HISTORY INFORMATION 3 |
| ... | ... | ... | ... | ... |

FIG. 20

| CONTROLLER ID | CERTIFICATE ID | SHARED KEY |
|---|---|---|
| CONTROLLER ID1 | CERTIFICATE ID (C1) | 96385・・・ |
| CONTROLLER ID2 | CERTIFICATE ID (C2) | 19283・・・ |
| ・・・ | ・・・ | ・・・ |

FIG. 21

| DEVICE ID | CERTIFICATE ID | SHARED KEY |
|---|---|---|
| DEVICE ID1 | CERTIFICATE ID (M1) | 01234・・・ |
| DEVICE ID2 | CERTIFICATE ID (M2) | 98765・・・ |
| DEVICE ID3 | CERTIFICATE ID (M3) | 19283・・・ |
| ・・・ | ・・・ | ・・・ |

FIG. 27

| DEVICE ID | CONTROL COMMAND |
|---|---|
| DEVICE ID1 | CONTROL COMMAND 1 (C1-1) |
| DEVICE ID1 | CONTROL COMMAND 2 (C1-2) |
| DEVICE ID2 | CONTROL COMMAND 1 (C2-1) |
| DEVICE ID2 | CONTROL COMMAND 2 (C2-2) |
| DEVICE ID2 | CONTROL COMMAND 3 (C2-3) |
| . . . | . . . |

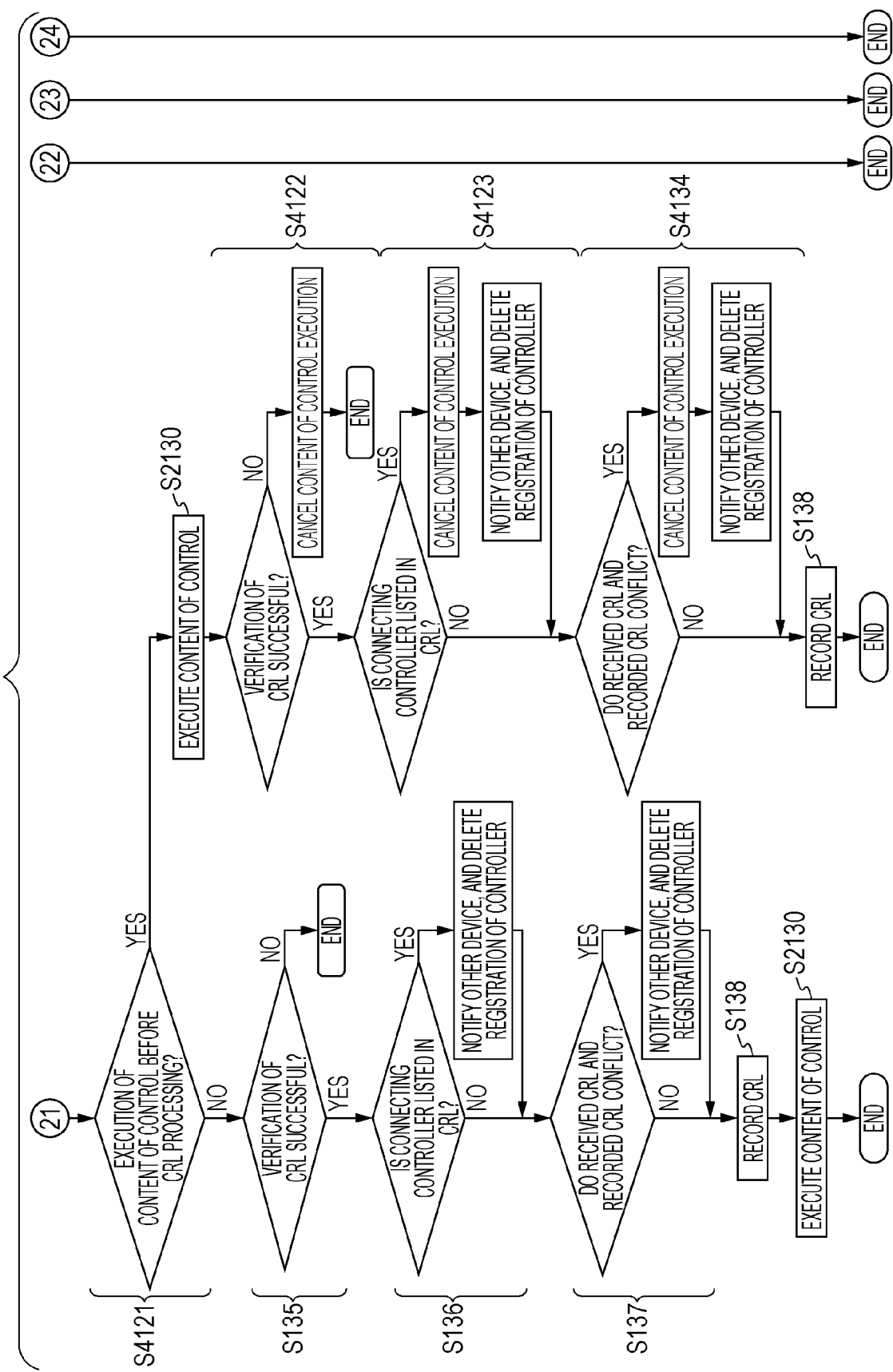

AUTHENTICATION SYSTEM AND AUTHENTICATION METHOD

BACKGROUND

1. Technical Field

The present invention relates to an authentication system that enables a device and controller to be safely connected.

2. Description of the Related Art

In recent years, home electric appliances and audiovisual devices have come to be connected to networks, and there is anticipation for services using various types of history information collected therefrom to the cloud. In this arrangement, a controller is installed in the home, and transmission of history information from the home electric appliance devices to a manufacturer's server is relayed through the controller. Setting the connection between the controller and the home electrical appliances so as to be safe enables communication within the home to be controlled, and leakage of information over wireless communication and connection to the in-home network by spoofing to be prevented.

To this end, the Wi-Fi Alliance has conventionally set forth a standard to facilitate connection among devices, called Wi-Fi Protected Setup (Wi-Fi Alliance, "Wi-Fi CERTIFIED Wi-Fi Protected Setup: Easing the User Experience for Home and Small Office Wi-FiR Networks (2010)", [online], December 2010, [Searched Jun. 24, 2014], Internet <URL: http://www.wi-fi.org/ja/file/wi-fi-certified-wi-fi-protected-setup%E2%84%A2-easing-the-user-experience-for-home-and-small-office-wi>). However, in Wi-Fi wireless connection, this only guarantees interconnection among devices at an access point of devices and home electric appliances, that is equivalent to a controller, and does not guarantee whether a connecting device is valid or not.

Usage of the Public Key Infrastructure (PKI) to authenticate the validity of devices has been conventionally known ("IT Text Information Security" compiled by Atsuko Miyaji/Hiroaki Kikuchi, published by Ohmsha, October 2003 (hereinafter, Miyaji et al)). Authentication based on PKI guarantees the validity of devices by authenticating that an entity (home electric appliance or controller) has a secret key and a public key certificate issued by a certificate authority. Once there is an occurrence of leakage of a secret key or the like regarding a public key certificate, the public key certificate needs to be revoked in order to prevent unauthorized use of the public key certificate. A representative way to revoke a public key certificate is a Certificate Revocation List (CRL) which is a list of certificate revocations (Miyaji et al). A CRL is a list of revoked public key certificates, with IDs and the like of revoked public key certificates affixed with the signature of the certificate authority that has issued the public key certificate, and distributed. The entity such as the home electric appliance or controller verifies whether the public key certificate of another entity to which it is to connect is not listed in the CRL. Accordingly, the newest CRL needs to be used.

SUMMARY

In one general aspect, the techniques disclosed here feature an authentication method in an authentication system including a device, an operating terminal that operates the device, and a controller, where authentication is performed between the controller and the device. The method includes: the device acquiring a first certificate revocation list from the controller and a second certificate revocation list along with control instructions from the operating terminal to the device, in which the first certificate revocation list and the second certificate revocation list are revocation lists relating to certificates of the controller and the device; and determining validity of the controller based on the first certificate revocation list or the second certificate revocation list.

According to the present disclosure, further improvement can be realized.

It should be noted that these general or specific embodiments may be implemented as a system, a device, a method, an integrated circuit, a computer program, or a storage medium, or any combination of a system, method, integrated circuit, computer program, and storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating an example of a connection controller management table of the device according to the first embodiment;

FIG. 9 is a diagram illustrating an example of a device information management table of the manufacturer server according to the first embodiment;

FIG. 20 is a diagram illustrating an example of a connection controller management table of the device according to the second embodiment;

FIG. 21 is a diagram illustrating an example of a connecting device management table of the controller according to the second embodiment;

FIG. 27 is a diagram illustrating an example of control device management table of the operating terminal according to the third embodiment;

FIG. 39 is a sequence diagram for when executing device control according to the fifth embodiment.

DETAILED DESCRIPTION

Figure 1:
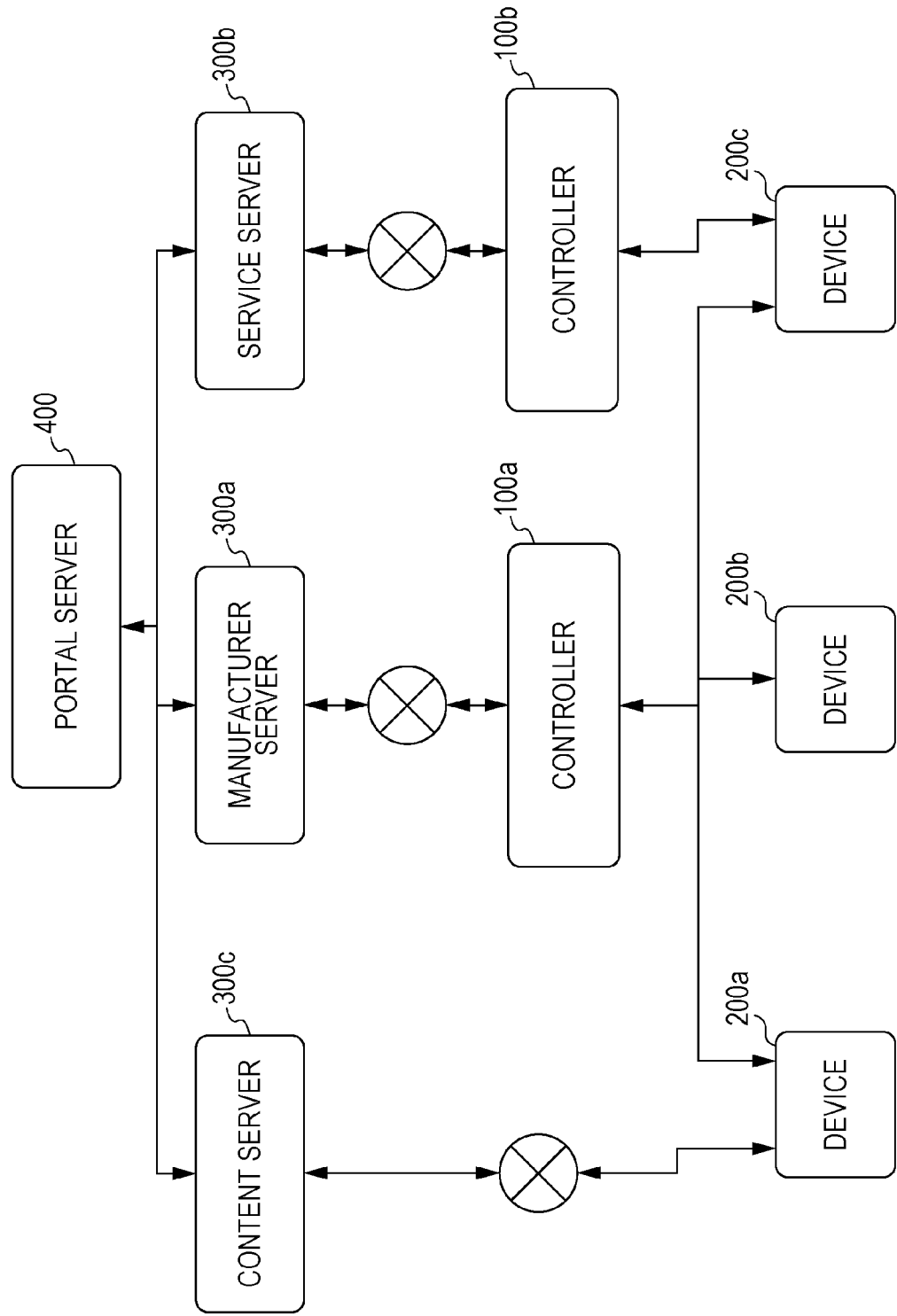
FIG. 1 is an overall configuration diagram of an authentication system according to a first embodiment.

Underlying Knowledge Forming Basis of the Present Disclosure

In a case where a home electric appliance connects only to one controller, the home electric appliance acquires the CRL via the controller. At this time, if the controller is an unauthorized device, even of the public key certificate is listed in the CRL, the home electric appliance will authenticate the controller as an authorized device unless the controller distributes a CRL, in which the public key certificate of the controller is listed, to the home electric appliance.

Based on the above observation, the present inventors arrived at the aspects of the present disclosure.

An authentication method according to an aspect of the present disclosure is an authentication method in an authentication system including a device, an operating terminal that operates the device, and a controller, where authentication is performed between the controller and the device. The method includes: the device acquiring a first certificate revocation list from the controller and a second certificate revocation list along with control instructions from the operating terminal to the device, in which the first certificate revocation list and the second certificate revocation list are revocation lists relating to certificates of the controller and the device; and determining validity of the controller based on the first certificate revocation list or the second certificate revocation list.

Accordingly, enabling updating of the CRL even for devices connected to unauthorized controllers enables connection to unauthorized controllers to be prevented, and safe connection to be realized among authorized controllers and devices.

The device may stop connection to the controller in a case where determination is that the controller is unauthorized.

The validity of the controller may be determined by comparing a next issue date of the first certificate revocation list and an issue date of the second certificate revocation list.

The authentication system may further include a server, the server providing the second certificate revocation list to the control command.

The device may perform, in accordance with the content of the control command, authentication of the validity of the controller, and determination of execution order of control processing and/or whether or not to execute, based on the content of the control command.

The authentication system according to embodiments of the present disclosure will be described below with reference to the drawings. Note that the embodiments described below indicate a preferred specific example of the present disclosure. That is to say, values, shapes, materials, components, placement and connection arrangement of components, steps, orders of steps, and so forth in the following embodiments are only exemplary, and are not intended to restrict the present disclosure. The present disclosure is defined based on the scope of the Claims. Accordingly, components in the following embodiments which are not included in an independent Claim of the present disclosure indicating the highest concept are described as being components which are not necessarily indispensable in achieving solving of the problem but make up a more preferable form.

First Embodiment

1. System Configuration

An authentication system 10 according to the present disclosure will be described here as an embodiment of the present disclosure, with reference to the drawings.

1.1 Overall Configuration of Authentication System 10

FIG. 1 is a diagram illustrating the overall configuration of the authentication system 10 according to the present disclosure. The authentication system 10 is configured including controllers 100, devices 200, servers 300, and a portal server 400. The controllers 100a and 100b are devices having functions of controlling devices. The controllers 100a and 100b also have functions of connecting to servers, transmitting information of home electric appliances to the server, receiving control requests from the servers, controlling the home electric appliances, and so forth. The devices 200a through 200c are home electric appliances and housing facility devices that collect device history information, such as televisions, recorders, air conditioners, refrigerators, batteries, and so forth.

The servers 300a through 300c are a content server that distributes content, a manufacture server of a manufacturer that manufactures home electric appliances, and a service server of a service provider that provides services. As a specific example, history information of a device in the home is transmitted to the controller, and the control transmits history information of the device to the manufacturer server. Also, in a case where the service server is an electric power company, the electric power company connects to the controller via a home smart meter (omitted from illustration). The controller controls devices in the home based on electric power information from the electric power company, and suppresses consumption of electric power within the home.

1.2 Configuration of Controller 100

Figure 2:
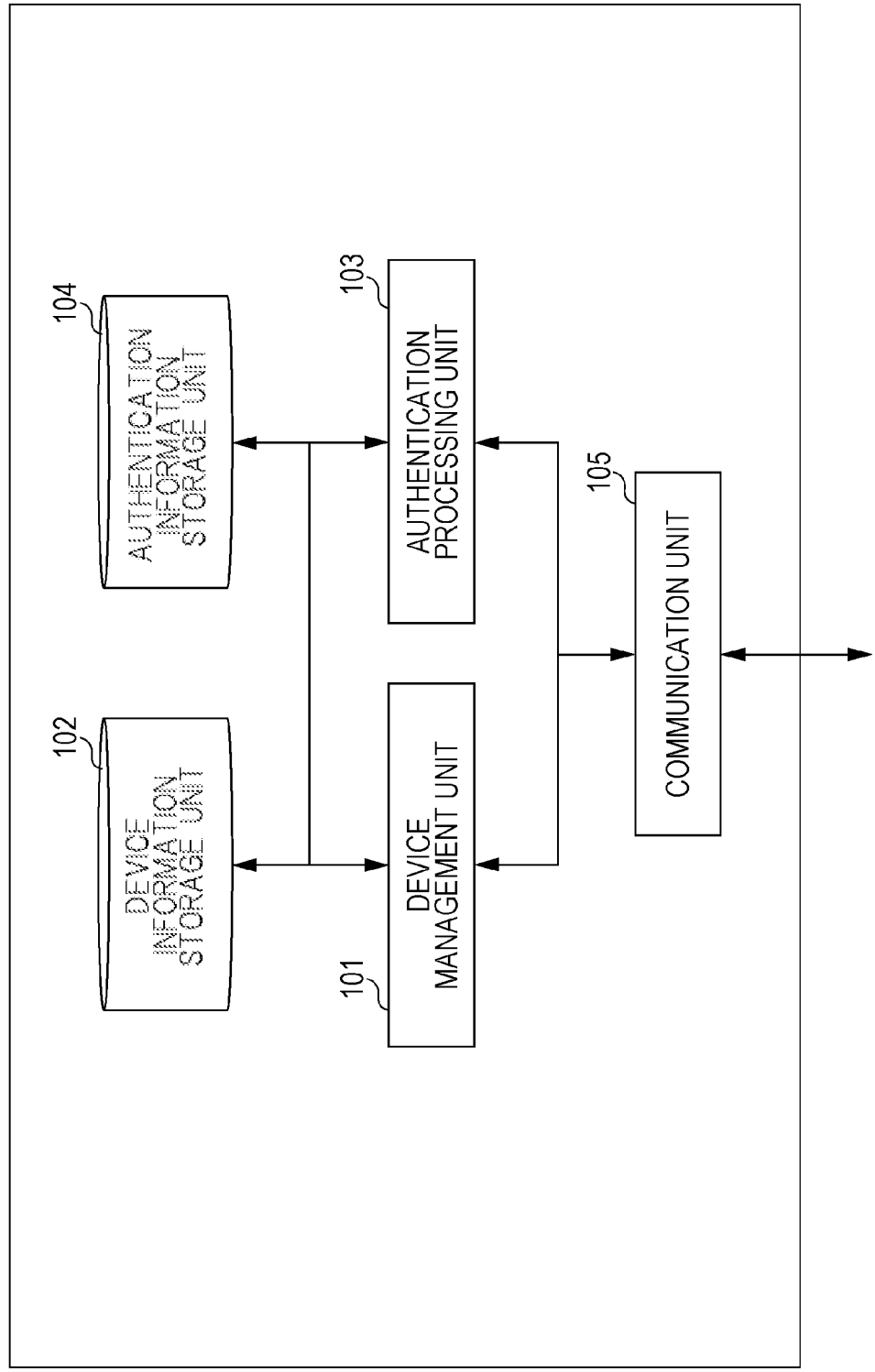
FIG. 2 is a configuration diagram of a controller according to the first embodiment.

FIG. 2 is a configuration diagram of the controller 100a. The controller 100a is configured including a device management unit 101, a device information storage unit 102, an authentication processing unit 103, an authentication information storage unit 104, and a communication unit 105. The controller 100b also is of the same configuration.

The device management unit 101 manages devices connected to the controller. In a case where there is a connection request from a device, the device management unit 101 transmits the public key certificate received from the device to the authentication processing unit 103, and requests authentication processing. The device management unit 101 receives the authentication results from the authentication processing unit 103. In a case where authentication has been successful, the device management unit 101 registers the device ID and certificate ID in a connecting device management table held at the device information storage unit 102.

Figures 3, 4:
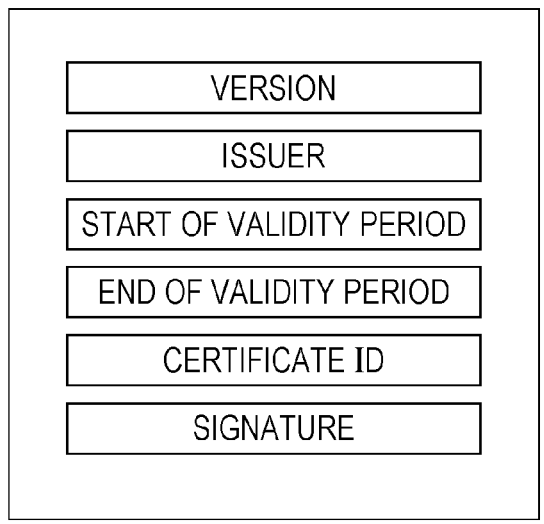
FIG. 3 is a diagram illustrating an example of a connection device management table of the controller according to the first embodiment.
FIG. 4 is a diagram illustrating an example of a public key certificate according to the first embodiment.

The device information storage unit 102 manages information of devices connecting to the controller. FIG. 3 is a diagram illustrating an example of a device information management table which the device information storage unit 102 holds. The device information management table records device IDs and certificate IDs of the public key certificates that the devices hold.

The authentication processing unit 103 performs authentication processing with the devices. Also, upon receiving an authentication request from the device management unit 101 along with a public key certificate of a device, the authentication processing unit 103 acquires the CRL recorded in the authentication information storage unit 104, and verifies whether the certificate ID of the public key certificate of the device is recorded in the CRL. The authentication processing unit 103 also verifies the signature of the public key certificate using the public key (omitted from illustration) of the portal server, which is the certificate authority. The authentication processing unit 103 also generates a random number and transmits the random number to the device. The authentication processing unit 103 verifies a signature of the random number received from the device. In a case where any one of the verifications fails, the authentication processing unit 103 determines that the device is an unauthorized device.

Figure 5:
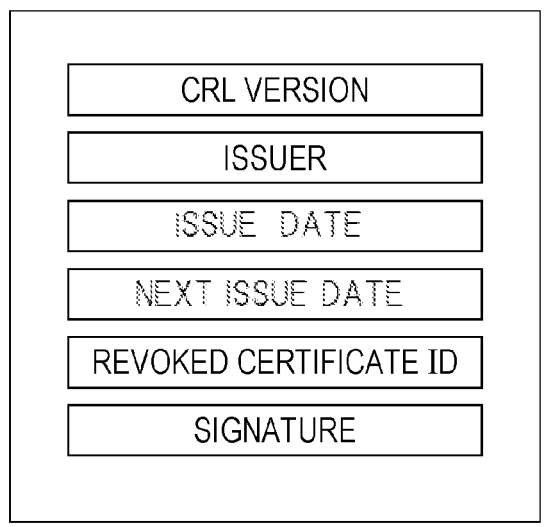
FIG. 5 is a diagram illustrating an example of a CRL according to the first embodiment.

The authentication information storage unit 104 holds a key pair of secret key and public key certificate, and the CRL. The secret key, public key certificate, and CRL are embedded in the authentication information storage unit 104 when shipping. FIG. 4 is a diagram illustrating an example of the configuration of a public key certificate. The public key certificate is configured including version, issuer, start and end of validity period, certificate ID, and signature of the portal server, which is the certificate authority. FIG. 5 is a diagram illustrating an example of the configuration of a CRL. The CRL is configured including CRL version, issuer, issue date, next issue date, revoked certificate ID, and signature of the portal server, which is the certificate authority. The certificate ID is not restricted to being one; multiple certificate IDs may be included.

The communication unit 105 communicates with the device 200, manufacturer server 300a, and service server 300b. The communication unit 105 communicates with the server via Secure Socket Layer (SSL) communication. Certificates necessary for SSL communication are recorded at the communication unit 105.

1.3 Configuration of Device 200

Figure 6:
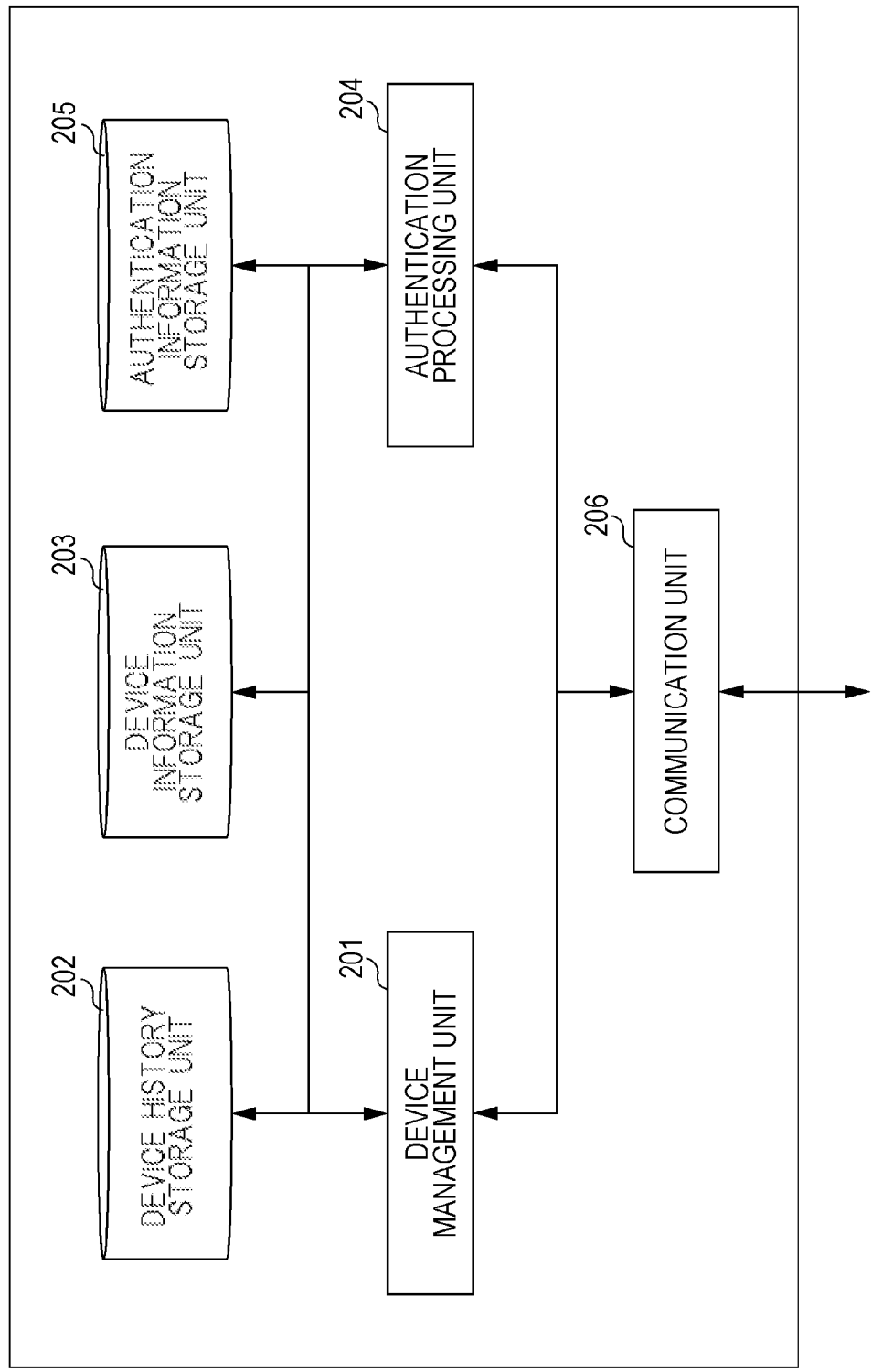
FIG. 6 is a configuration diagram of a device according to the first embodiment.

FIG. 6 is a configuration diagram of the device 200. The device 200 includes a device management unit 201, a device history storage unit 202, a device information storage unit 203, an authentication processing unit 204, an authentication information storage unit 205, and a communication unit 206.

The device management unit 201 transmits a connection request to the controller 100 when starting up. In a case of connecting to the content server 300c instead of connecting to the controller, the communication unit 206 performs SSL communication with the content server 300c. The device management unit 201 transmits an authentication request to the authentication processing unit 204 upon receiving a public key certificate from the controller. The device management unit 201 receives the results of authentication from the authentication processing unit 204. In a case where authentication is successful, the device management unit 201 registers the controller ID and certificate ID in a connecting controller management table held at the device information storage unit 203. The device management unit 201 also periodically or non-periodically transmits device history recorded at the device history storage unit 202 to the server via the controller. Note that in a case where direct connection has been made to the content server, transmission is made to the server without going through the controller.

The device history storage unit 202 acquires and records operation history of the device. The device information storage unit 203 manages information of the controller 100 connecting to the device. FIG. 7 is a diagram illustrating an example of a connecting controller management table which the device information storage unit 203 holds. The connecting controller management table records controller IDs and certificate IDs of the public key certificates which the controllers hold.

The authentication processing unit 204 performs authentication processing with the controller. Also, upon receiving an authentication request from the device management unit 201 along with a public key certificate, the authentication processing unit 204 acquires the CRL recorded in the authentication information storage unit 205, and verifies whether the certificate ID of the public key certificate of the controller is recorded in the CRL. The authentication processing unit 204 also verifies the signature of the public key certificate using the public key (omitted from illustration) of the portal server, which is the certificate authority. The authentication processing unit 204 also generates a random number and transmits the random number to the controller. The authentication processing unit 204 verifies a signature of the random number received from the controller. In a case where any one of the verifications fails, the authentication processing unit 204 determines that the controller is an unauthorized device.

The authentication information storage unit 205 holds a key pair of secret key and public key certificate, and the CRL. The key pair of the secret key and public key certificate, and the CRL are embedded in the authentication information storage unit 205 when shipping the device. The public key certificate and CRL are of the same configuration as the public key certificate and CRL of the controller, so description will be omitted here.

The communication unit 206 communicates with the controller 100 and content server 300c. The communication unit 206 communicates with the content server via SSL communication. Certificates necessary for SSL communication are recorded at the communication unit 206.

1.4 Configuration of Manufacturer Server 300a

Figure 8:
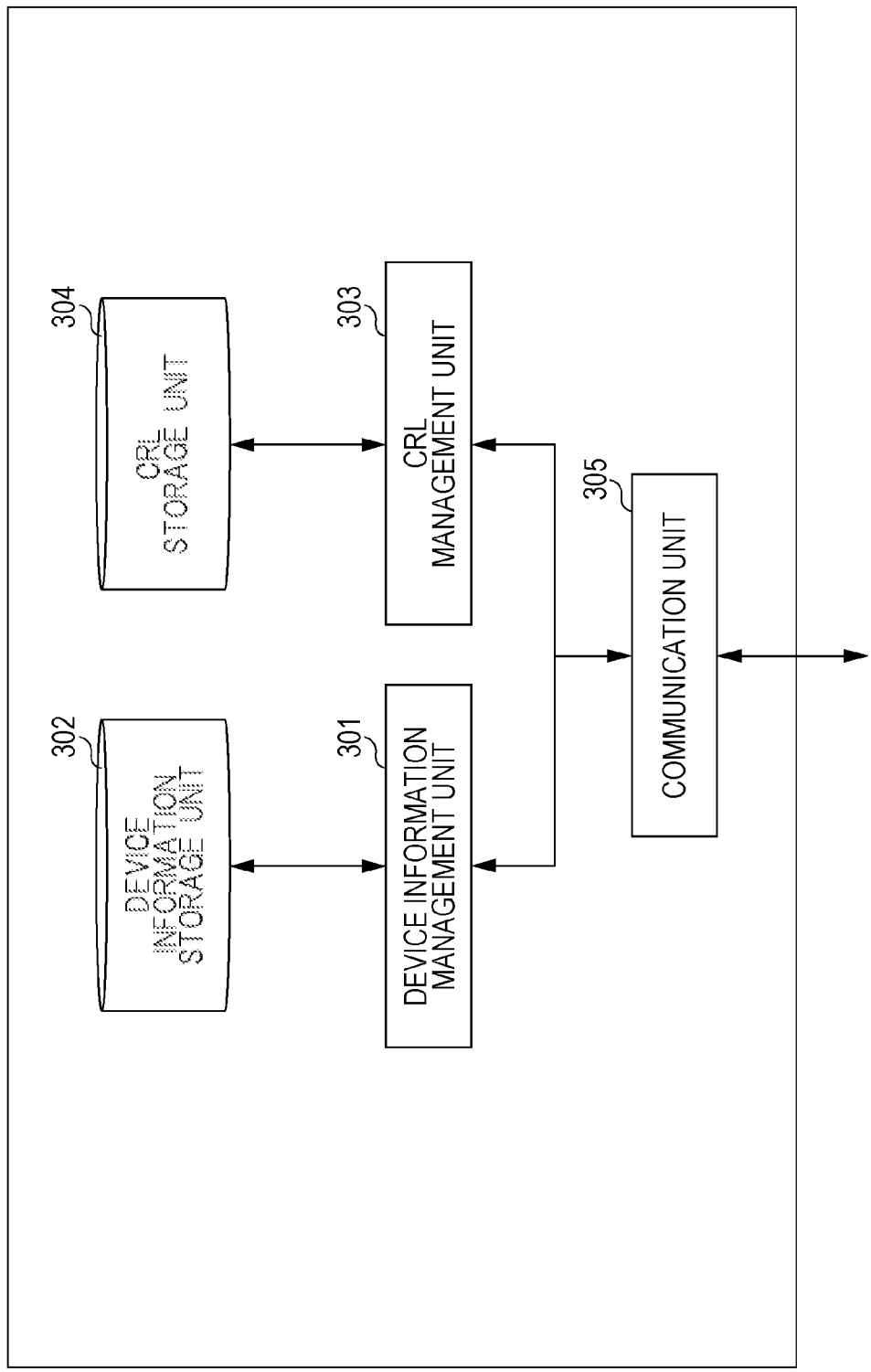
FIG. 8 is a configuration diagram of a manufacturer server according to the first embodiment.

FIG. 8 is a configuration diagram of the manufacturer server 300a. The manufacturer server 300a is configured including a device information management unit 301, a device information storage unit 302, a CRL management unit 303, a CRL storage unit 304, and a communication unit 305. The service server 300b is configured in the same way.

The device information management unit 301 controls the device information storage unit 302, and manages association between controllers and devices, IDs of controllers and devices being connected and certificate IDs of public key certificates, and device history. Also, upon having detected an unauthorized device or controller, the device information management unit 301 notifies the portal server of the certificate ID of the public key certificate of that device or controller, and places a CRL issue request. In a case of having updated the CRL, the device information management unit 301 transmits the CRL to the CRL management unit 303.

The device information storage unit 302 records the IDs and certificate IDs of the controller and devices, and device history. FIG. 9 is a diagram illustrating an example of a device information management table that the device information storage unit 302 holds. This shows that device ID1 through device ID3 are connected to the controller with the controller ID1, which is the ID of the controller. This also shows that the certificate ID of the controller and the certificate IDs of the devices also are recorded. This shows that the history information of the device ID1 is recorded in the history information 1.

The CRL management unit 303 controls the CRL storage unit 304, and upon having received a CRL from the device information management unit 301, updates the CRL of the CRL storage unit 304. The CRL storage unit 304 records CRLs.

The communication unit 305 communicates with the controller 100a and the portal server 400. Communication with the controller 100a and portal server 400 is performed via SSL communication. Certificates necessary for SSL communication are recorded in the communication unit 305.

The configuration of the content server 300c differs from that of the manufacturer server 300a. Connection is made with devices without going through the controller, so SSL authentication is performed between the content server 300c and the devices. The device information management table of the device information storage unit 302 is thus a device information management table with no controller information.

1.5 Configuration of Portal Server 400

Figure 10:
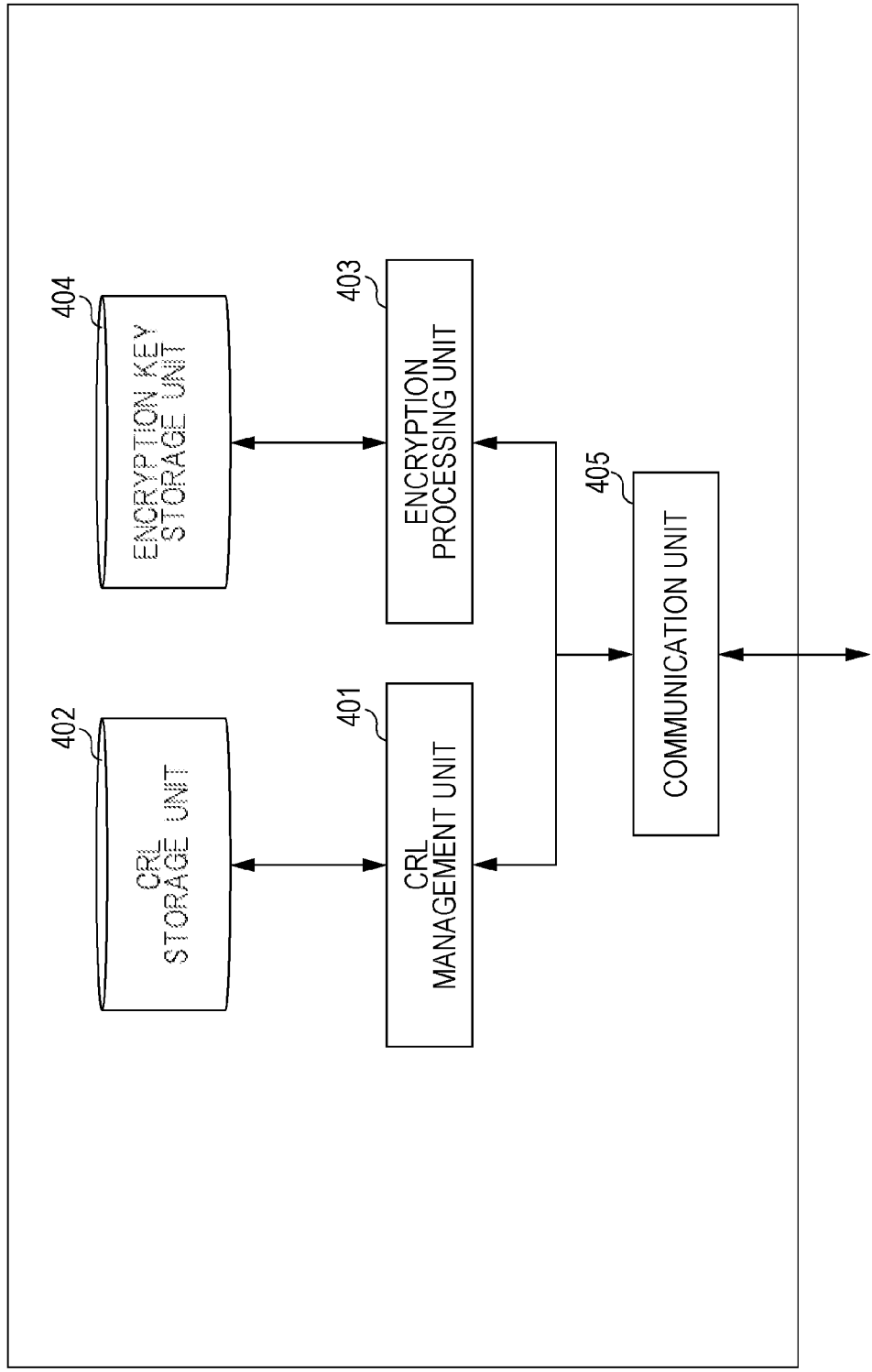
FIG. 10 is a configuration diagram of a portal server according to the first embodiment.

FIG. 10 is a configuration diagram of the portal server 400. The portal server 400 includes a CRL management unit 401, a CRL storage unit 402, an encryption processing unit 403, an encryption key storage unit 404, and a communication unit 405.

The CRL management unit 401 controls the CRL storage unit 402 to manage the CRLs. Upon receiving a CRL issue request from the manufacturer server 300a or service server 300b or the like, the CRL management unit 401 sets data other than signature in the CRL, and requests the encryption processing unit 403 to generate a CRL signature. The CRL management unit 401 receives the CRL with the generated signature from the encryption processing unit 403, and records in the CRL storage unit 402. The CRL storage unit 402 records the issued CRL.

Upon receiving a request for signature generation from the CRL management unit 401, the encryption processing unit 403 uses a secret key held at the encryption key storage unit 404 to generate the CRL signature. Once the CRL signature is generated, the encryption processing unit 403 transmits the generated CRL signature to the CRL management unit 401.

The encryption key storage unit 404 holds the secret key for issuing a CRL for the portal server 400 which is the certificate authority.

The communication unit 405 performs communication with the servers 300a through 300c. The servers 300a through 300c perform SSL communication. Certificates necessary for SSL communication are recorded at the communication unit 405.

1.6 Operations of Authentication System 10

Operations of the authentication system 10 include the following.
(1) Device registration processing where connection is made from device to controller, and registration is made in server
(2) Processing to update CRL of manufacturer server 300a
(3) Processing to update CRL of device These will each be described below with reference to the drawings.

1.6.1 Operations at Time of Device Registration Processing

Figure 11:
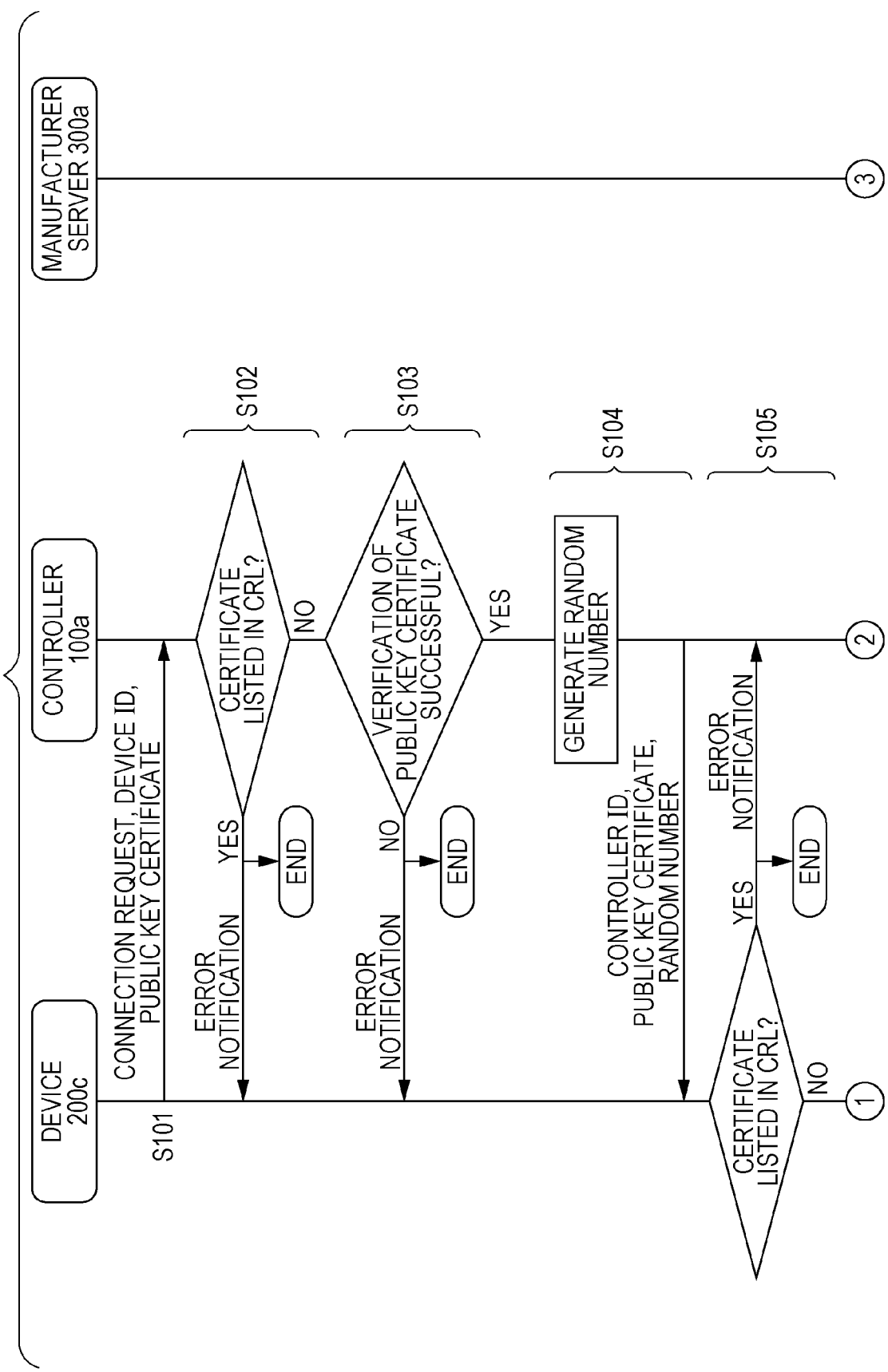
FIG. 11 is a sequence diagram for when registering a device, according to the first embodiment.
Figure 12:
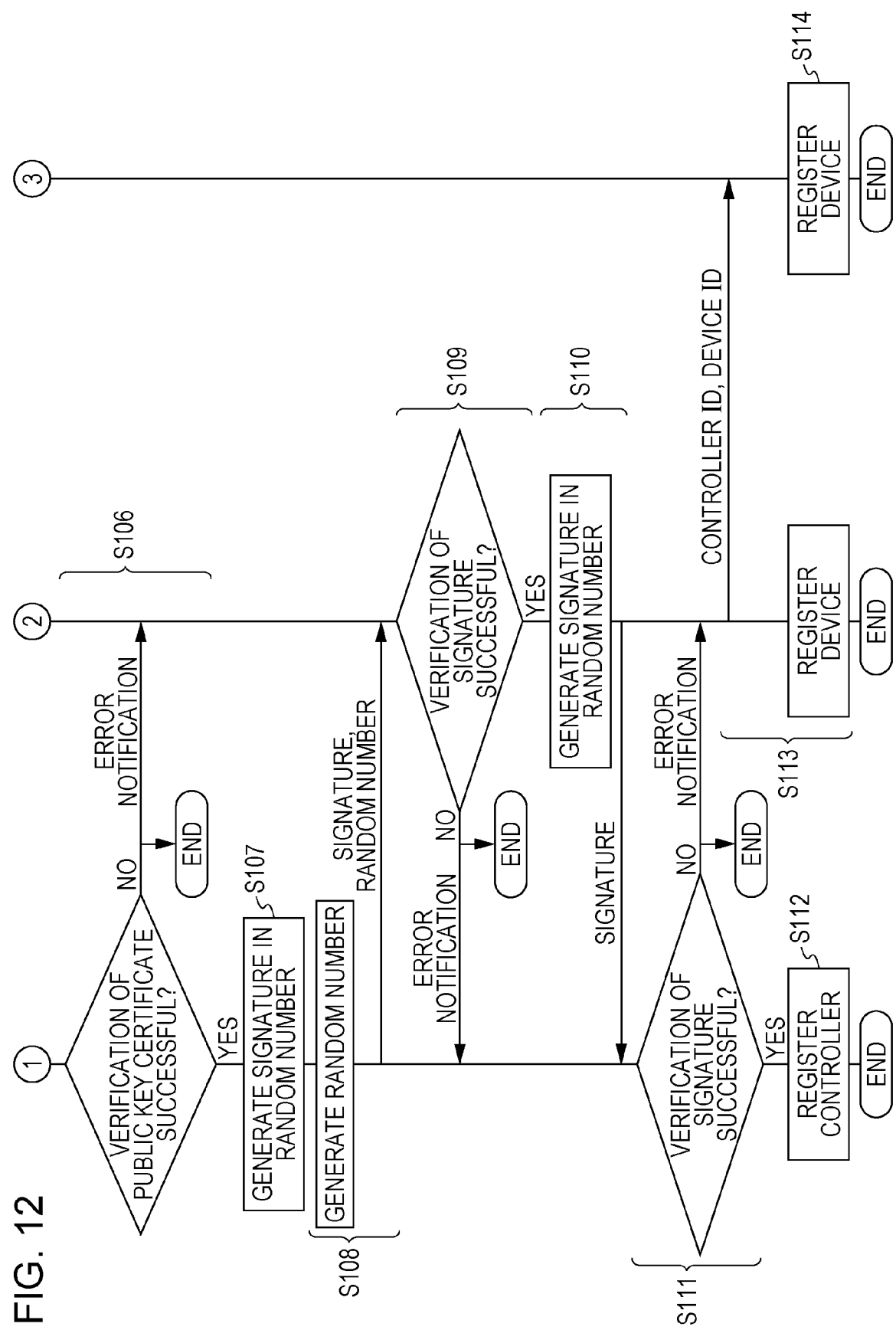
FIG. 12 is a sequence diagram for when registering a device, according to the first embodiment.

FIGS. 11 and 12 illustrate a sequence of processing where the device 200c connects to the controller 100a, and is registered to the manufacturer server 300a. Processing where the device 200a or 200b connect to the controller 100a and are registered to the manufacturer server 300a, and processing where the device 200c connects to the controller 100b and is registered to the service server 300a are the same.

In S101, a connection request is performed from the device 200c to the controller 100a. The device ID and public key certificate of the device are also transmitted at this time.

In S102, verification is performed regarding whether or not the certificate ID of the public key certificate of the device 200c, regarding which the controller 100a has received the connection request, is listed in the CRL held in the authentication information storage unit. If listed in the CRL, an error is notified to the device 200c and the processing ends.

In S103, the controller 100a verifies the signature of the public key certificate received from the device 200c. In a case where the verification is not successful, the device 200c is notified of an error and the processing ends. The signature at this time may be an elliptic curve digital signature algorithm (ECDSA).

ECDSA is described in National Security Agency, "Suite B Implementer's Guide to FIPS 186-3 (ECDSA)", [online], Feb. 3, 2010, [Searched Jun. 24, 2014], Internet <URL: http://www.nsa.gov/ia/_files/ecdsa.pdf>, and accordingly will not be described here.

In S104, the controller 100a generates a random number, and transmits to the device 200c along with the controller ID and public key certificate.

In S105, the device 200c verifies whether the certificate ID of the public key certificate of the controller 100a which has transmitted the connection request is listed in the CRL that it holds. If listed in the CRL, an error is notified to the controller 100a and the processing ends.

In S106, the device 200c verifies the signature of the public key certificate received from the controller 100a. In a case where verification fails, an error is notified to the controller 100a and the processing ends.

In S107, the device 200c generates a signature from the random number received from the controller 100a and the secret key of the device 200c.

In S108, the device 200c generates a random number, and transmits to the controller 100a along with the signature generated in S107.

In S109, the controller 100a receives the signature and random number, and verifies the signature using the public key certificate received in S101. In a case where verification of the signature fails, an error is notified to the device 200c and the processing ends.

In S110, the controller 100a generates a signature from the random number received in S109 and the secret key of the controller 100a, and transmits the signature to the device 200a.

In S111, the device 200c receives the signature, and verifies the signature using the public key certificate received in S104. In a case where verification of the signature fails, an error is notified to the controller 100a and the processing ends.

In S112, in a case where verification in S111 is successful, the device 200c registers the controller in the connecting controller management table.

In S113, the controller 100a transmits the controller ID and certificate ID of the public key certificate, and the device ID of the device regarding which verification was successful in S109 and the certificate ID of the public key certificate, to the manufacturer server, and registers the device ID of the device and the certificate ID of the public key certificate in the connecting device management table.

In S114, upon receiving, from the controller 100a, the controller ID and certificate ID of the public key certificate of the controller 100a and the device ID and certificate ID of the public key certificate of the device 200c, the manufacturer server 300a registers in the device information management table.

Figure 13:
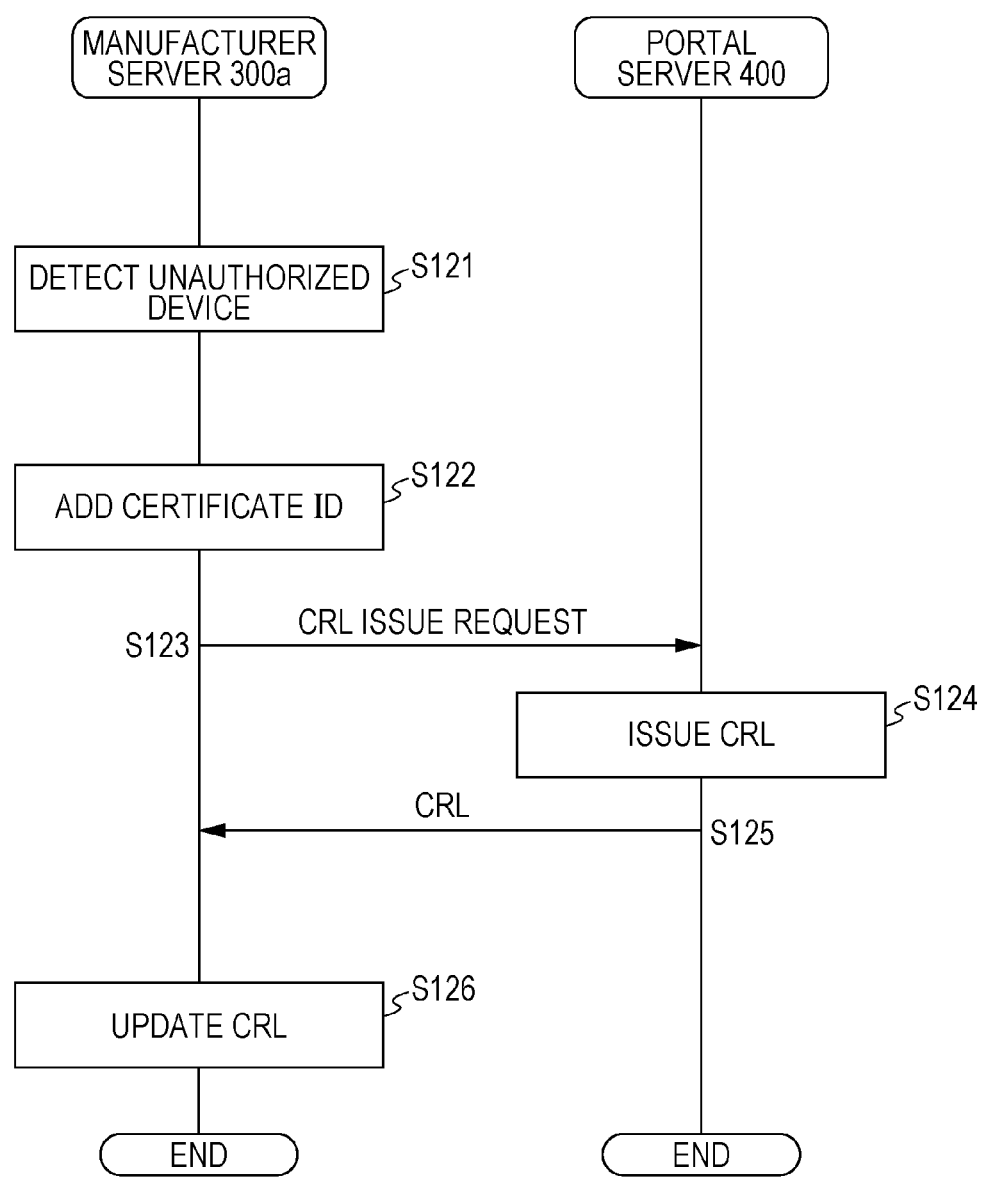
FIG. 13 is a sequence diagram for when updating a CRL of a manufacturer server, according to the first embodiment.

1.6.2 Operations at Time of Processing to Update CRL of Manufacturer Server 300a FIG. 13 illustrates a sequence of updating the CRL of the manufacturer server 300a. In S121, the manufacturer server 300a detects an unauthorized device. Specific examples are a case of detecting multiple controllers connecting to the manufacturer server 300a with the same certificate ID, a case of detecting multiple devices of the same certificate ID registered to the manufacturer server 300a, and so forth. Also, in a case where leakage of a secret key has been detected, a device or controller having a public key certificate corresponding thereto is also determined to be an unauthorized device.

In S122, the manufacturer server 300a adds the certificate ID of the unauthorized device or the unauthorized controller detected in S121, to the certificate IDs listed in the CRL.

In S123, the manufacturer server 300a transmits a CRL issue request along with the certificate IDs of the public key certificates of all unauthorized devices and unauthorized controllers, to the portal server 400 which is the certificate authority.

In S124, the portal server 400 issues a CRL from the received certificate IDs.

In S125, the portal server 400 transmits the CRL to the manufacturer server 300a.

In S126, the manufacturer server 300a records the received CRL in the CRL storage unit, thereby updating to the newest CRL.

The above is an example of processing of updating the CRL of the manufacturer server 300a, but processing for updating CRLs held by the service server 300b and content server 300c is the same processing. Also, even if detecting no unauthorized devices in S121, the manufacturer server 300a updates the CRL before the next issue date.

1.6.3 Operations at Time of Processing to Update CRL of Device

Figure 14:
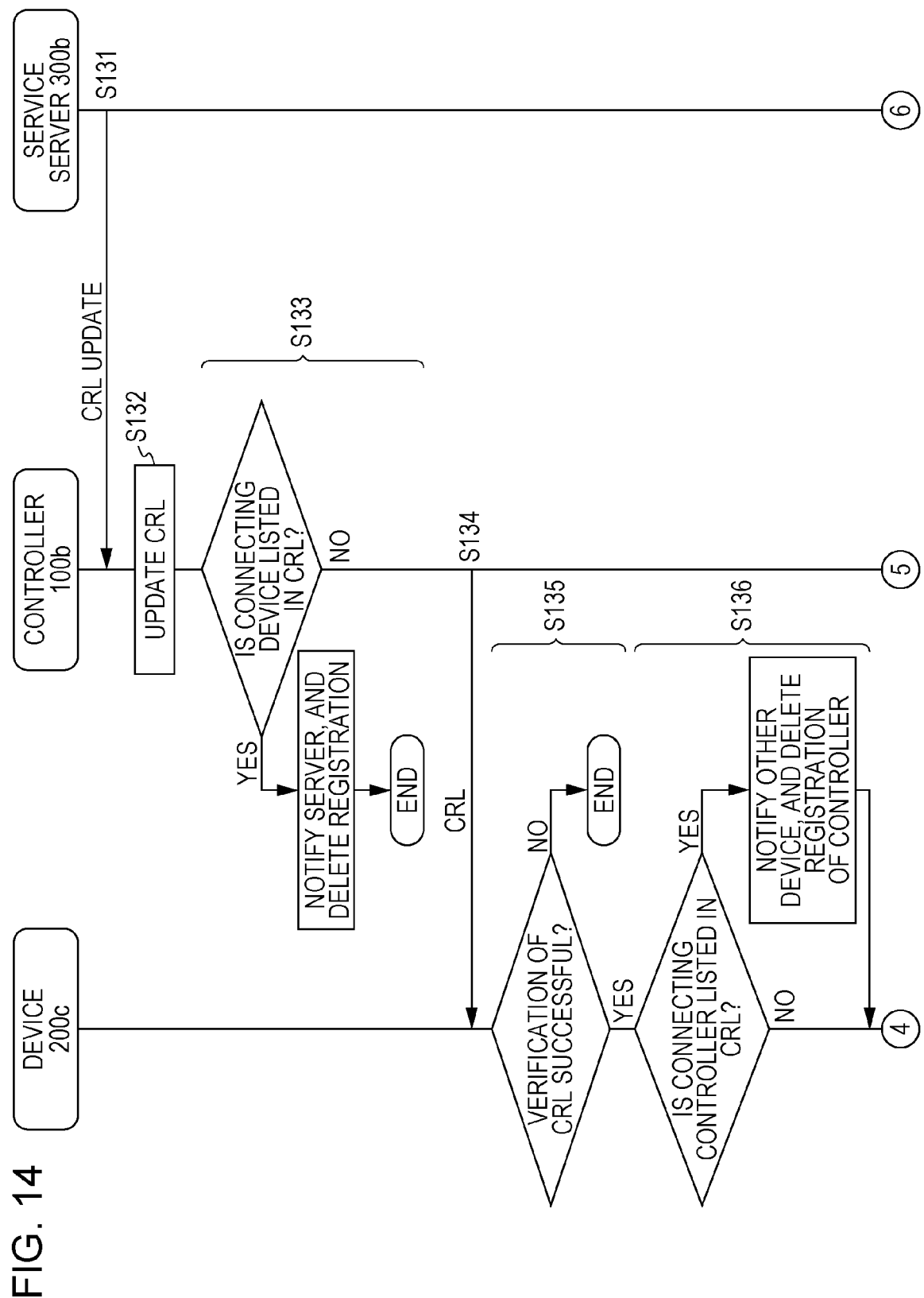
FIG. 14 is a sequence diagram for when updating a CRL of a device, according to the first embodiment.
Figure 15:
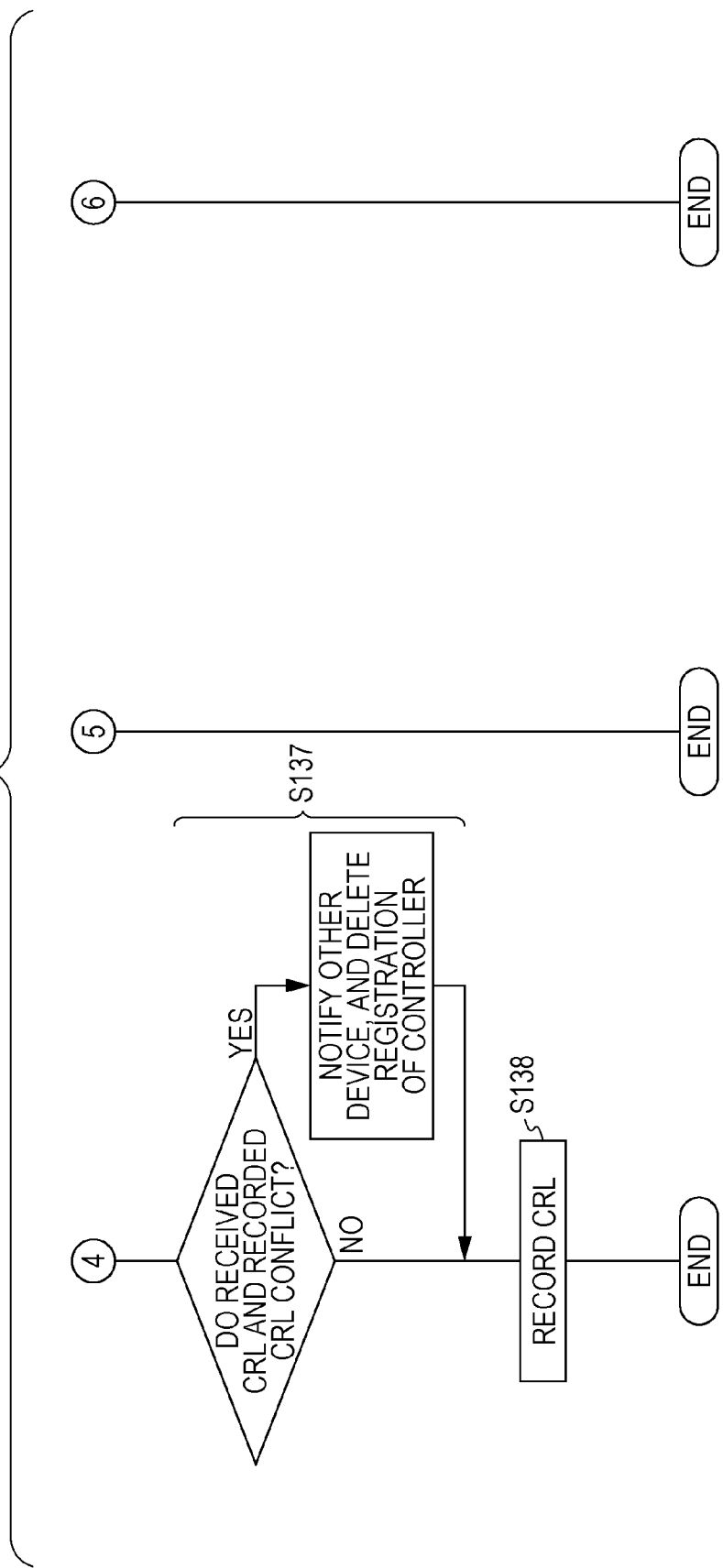
FIG. 15 is a sequence diagram for when updating a CRL of the device, according to the first embodiment.

FIGS. 14 and 15 illustrate a sequence to update the CRL of the device 200c from the controller 100b. Although an example of processing where the controller 100b updates the CRL of the device 200c will be described, the processing for updating the CRL of the device 200c from the controller 100a is the same.

In S131, after updating the CRL, the service server 300b requests the controller 100b for CRL updating processing along with the CRL.

In S132, the controller 100b updates to the CRL received from the service server 300b.

In S133, the controller 100b verifies whether a connecting device is listed in the CRL. If listed, this is notified to the service server 300b, and the registration of the listed device is deleted.

In S134, the controller 100b requests all connecting devices 200 for CRL updating processing along with the CRL. Description will be made here based on an example of requesting the device 200c to perform updating processing.

In S135, the device 200c verifies the signature of the received CRL. In a case where verification is not successful, the CRL updating processing ends.

In S136, the device 200c verifies whether or not any connecting controllers are listed in the CRL. If even one connecting controller is listed, the other devices and controllers are notified of detection of an unauthorized controller. Registration of this unauthorized controller is deleted from the connecting controller management table as well.

In S137, the device 200c compares the CRL received from the controller 100b and the CRL in the authentication information storage unit, and verifies whether or not there is inconsistency. Specifically, in a case where a CRL received from the controller 100a has been recorded, comparison is made between the issue date of the CRL received from the controller 100b and the next issue date of the CRL received from the controller 100a. In a case where the next issue date of the CRL received from the controller 100a is before the issue date of the CRL received from the controller 100b, determination is made that the next issue date of the CRL received from the controller 100a has passed, so the controller 100a is detected as an unauthorized controller since it did not update the CRL. Also, the versions of the CRLs received from the controller 100*a* and the controller 100*b* are compared, and if the CRL version does not match, the controller which transmitted the older version CRL is detected as an unauthorized controller since it did not update the CRL. At this time, the device 200*c* notifies the other devices and controllers of detection of an unauthorized controller. Registration of this unauthorized controller is deleted from the connecting controller management table as well. Connection with the controller 100*a* is also cut off.

In S138, the device 200*c* records the received CRL in the authentication information storage unit.

Figure 16:
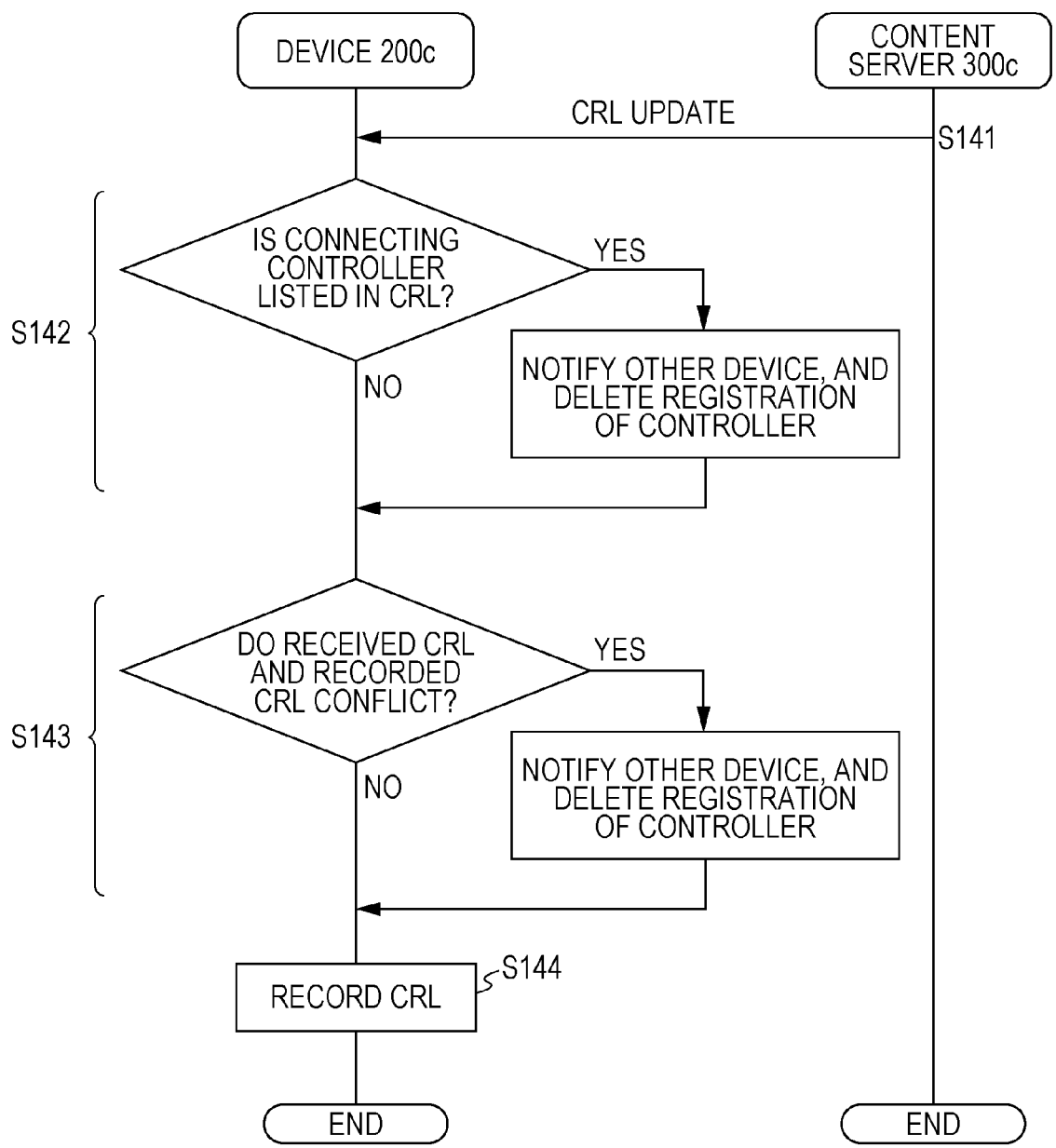
FIG. 16 is a sequence diagram for when updating a CRL of the device, according to the first embodiment.

FIG. 16 illustrates a sequence of the content server 300*c* updating the CRL of the device 200*c*. In S141, after updating the CRL, the content server 300*c* requests the device 200*a* for CRL updating processing along with the CRL.

In S142, the device 200*c* verifies whether or not any connecting controllers are listed in the CRL. If even one connecting controller is listed, the other devices, controllers, and content server 300*c* are notified of detection of an unauthorized controller. Registration of this unauthorized controller is deleted from the connecting controller management table as well.

S143 is the same as the processing S137 and thus description thereof will be omitted.

S144 is the same as the processing S138 and thus description thereof will be omitted.

1.7 Advantages of First Embodiment

A device which connects to one controller cannot update the CRL if this controller is an unauthorized controller. In the first embodiment, the device receives CRLs from multiple controllers. Thus, the CRL can be acquired via multiple networks, and updating can be performed. Enabling updating of the CRL enables connection to unauthorized controllers to be prevented, and safe connection to be realized among authorized controllers and devices.

Second Embodiment

2. System Configuration

An authentication system 11 according to the present disclosure will be described here as an embodiment of the present disclosure, with reference to the drawings. In the authentication system 11 according to a second embodiment, an encryption key of communication is shared between the controller and device after authentication, and history information of the device is transmitted to the server by encrypted communication.

2.1 Overall Configuration of Authentication System 11

The overall configuration of the authentication system 11 according to the second embodiment is the same as in the first embodiment, and accordingly description thereof will be omitted here. Components having the same configuration as those in the first embodiment are denoted by the same reference numerals, and description will be omitted.

2.2 Operations of Authentication System 11

Operations of the authentication system 11 include the following.

(1) Device registration processing where connection is made from device to controller, and registration is made in server
(2) Processing to update CRL of manufacturer server 300*a*
(3) Processing to update CRL of device
(4) Processing to transmit device history information from device to server The processing of (2) and (3) is the same as in the first embodiment, so description will be omitted here. Each of these will be described below with reference to the drawings.

2.2.1 Operations at Time of Device Registration Processing

Figure 17:
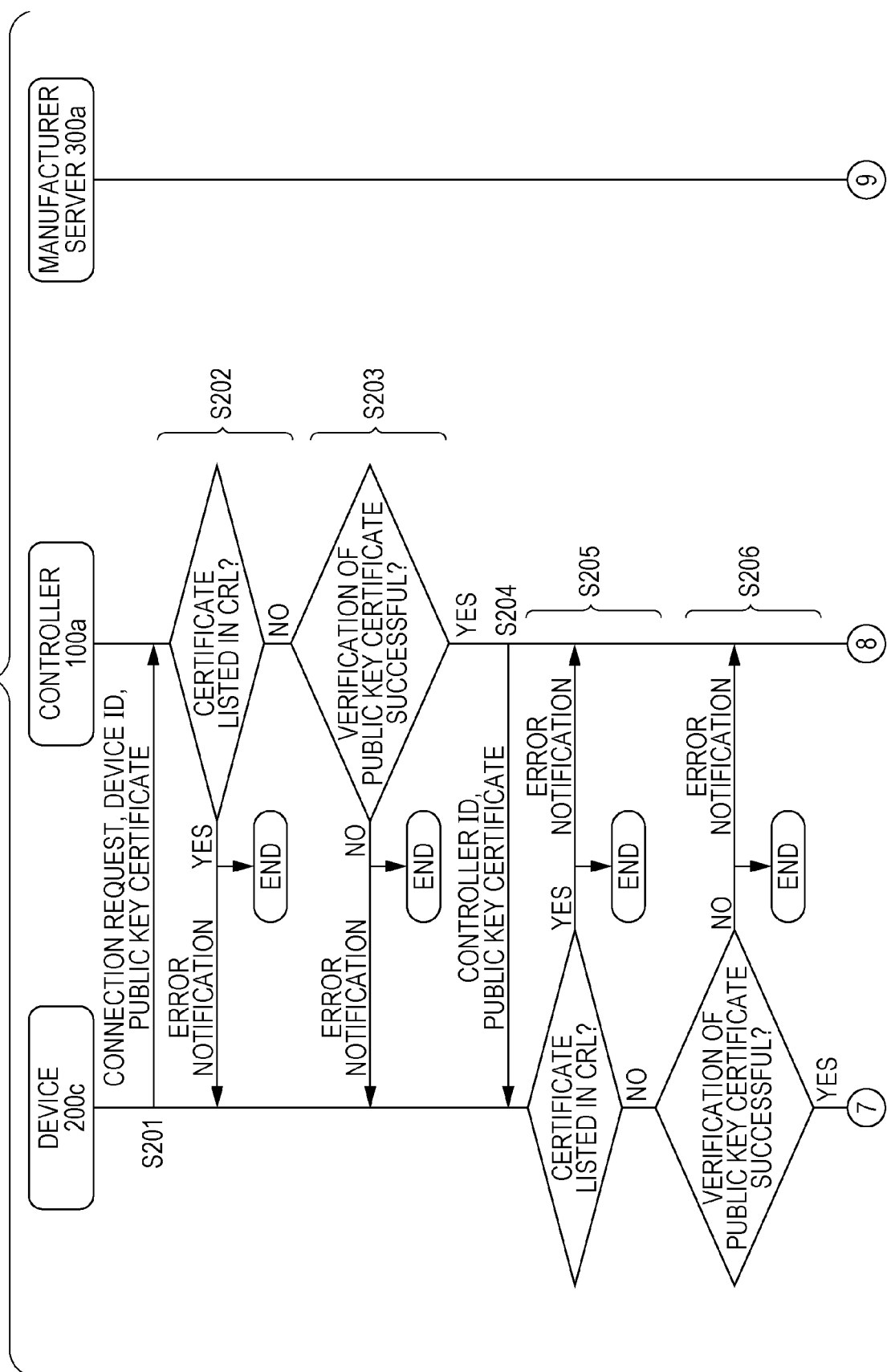
FIG. 17 is a sequence diagram for when registering a device, according to a second embodiment.
Figure 18:
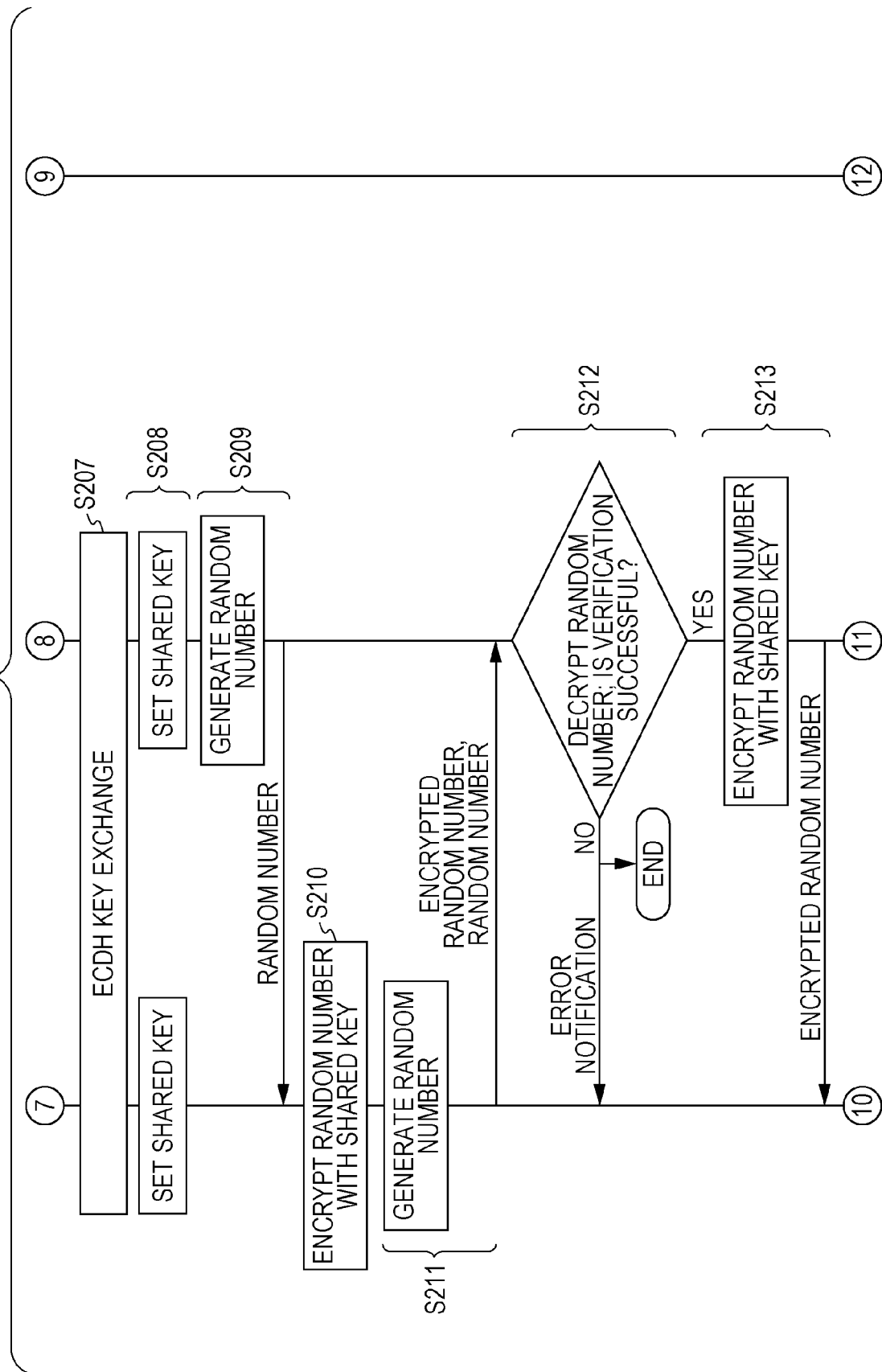
FIG. 18 is a sequence diagram for when registering the device, according to the second embodiment.
Figure 19:
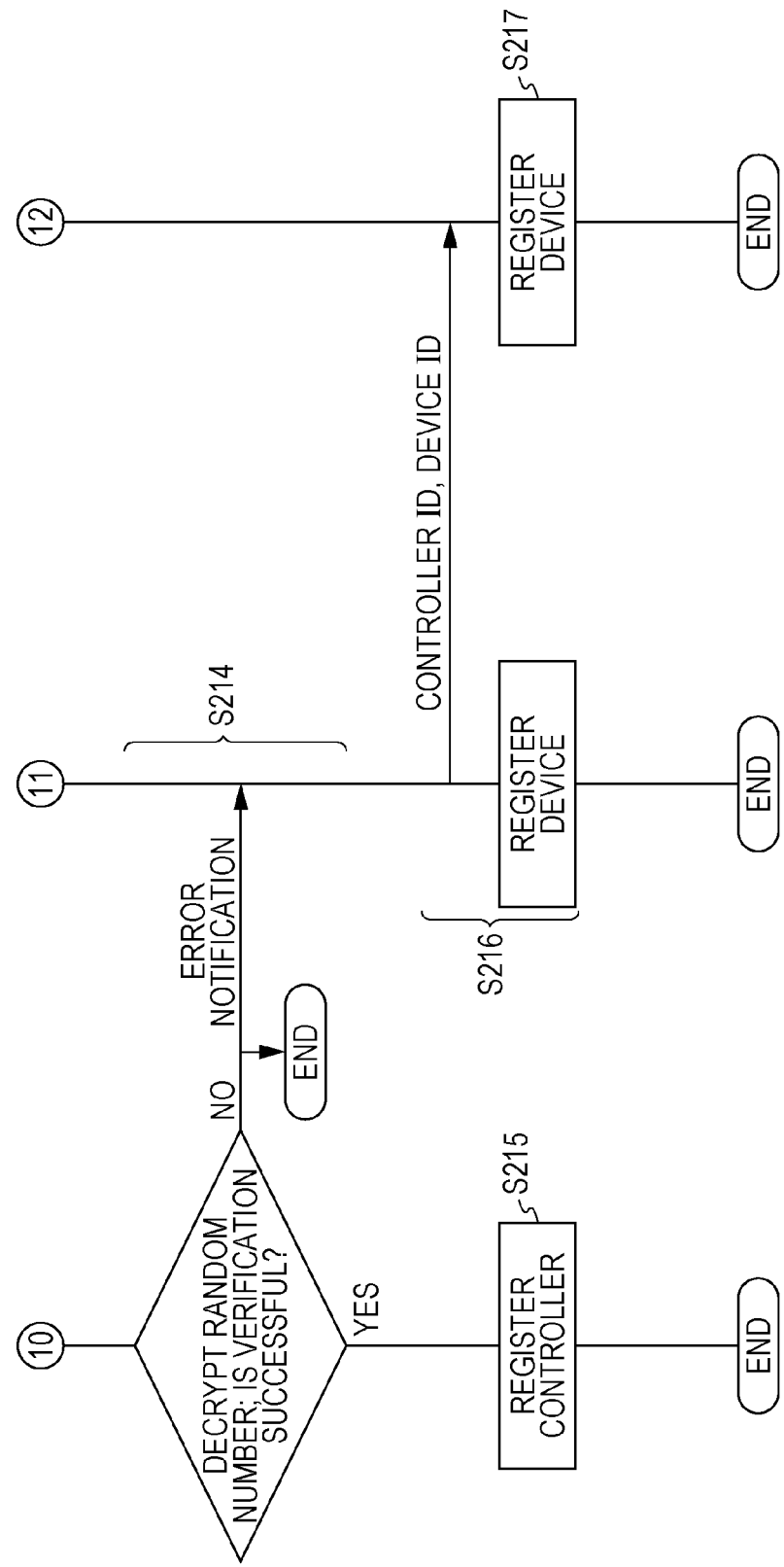
FIG. 19 is a sequence diagram for when registering the device, according to the second embodiment.

FIGS. 17 through 19 illustrate a sequence of processing where the device 200*c* connects to the controller 100*a*, and is registered to the manufacturer server. Processing where the device 200*a* or 200*b* connect to the controller 100*a* and are registered to the manufacturer server 300*a*, and processing where the device 200*c* connects to the controller 100*b*, and is registered to the service server, are the same.

The processing in S201 through S203 is the same as the processing in S101 through S103 in the first embodiment, so description will be omitted here.

In S204, the controller 100*a* transmits the controller ID and public key certificate to the device 200*c*.

The processing in S205 through S206 is the same as the processing in S105 through S106 in the first embodiment, so description will be omitted here.

In S207, the device 200*c* and controller 100*a* exchange keys. Elliptic curve Diffie-Hellman (ECDH), which is an elliptic curve cryptography key exchange method, is used here.

ECDH is described in "Elaine Barker, three others, NIST Special Publication 800-56A Revision 2, 'Recommendation for Pair-Wise Key-Establishment Schemes Using Discrete Logarithm Cryptography', [online], May 13, 2013, National Institute of Standards and Technology, [Searched Jun. 24, 2014], Internet <URL: http://nvlpubs.nist.gov/nistpubs/SpecialPublications/NIST.SP.800-56Ar2.pdf>", and accordingly will not be described here.

In S208, the device 200*c* and controller 100*a* set the key shared in the key exchange as a shared key.

In S209, the controller 100*a* generates a random number, and transmits to the device 200*c*.

In S210, the device 200*c* receives the random number from the controller 100*a*, and encrypts using the shared key.

In S211, the device 200*c* generates a random number, and transmits to the controller 100*a* along with the encrypted random number generated in S210.

In S212, the controller 100*a* receives the encrypted random number and the random number, decrypts the encrypted random number using the shared key, and verifies whether it matches the random number generated in S209. In a case where verification fails, an error is notified to the device 200*c* and the processing ends.

In S213, In a case where verification is successful in S212, the controller 100*a* uses the shared key to encrypt the random number received in S212, and transmits the encrypted random number to the device 200*c*.

In S214, the device 200*c* receives the encrypted random number, decrypts the encrypted random number using the shared key, and verifies whether it matches the random number generated in S211. In a case where verification fails, an error is notified to the controller 100*a* and the processing ends.

In S215, in a case where verification is successful in S214, the device 200*c* registers the controller 100*a* in the connecting controller management table. FIG. 20 is a connecting controller management table according to the second embodiment, configured including the shared key shared with the controller, in addition to the connecting controller management table according to the first embodiment.

In S216, the controller 100a transmits the controller ID and certificate ID of the public key certificate, and the device ID of the device regarding which verification was successful in S212 and the certificate ID of the public key certificate, to the manufacturer server 300a, and registers the device ID of the device and the certificate ID of the public key certificate in the connecting device management table.

FIG. 21 is a connecting device management table according to the second embodiment, configured including the shared key shared with the device, in addition to the connecting device management table according to the first embodiment.

The processing in S217 is the same as the processing in S114 in the first embodiment, so description will be omitted here.

Figure 22:
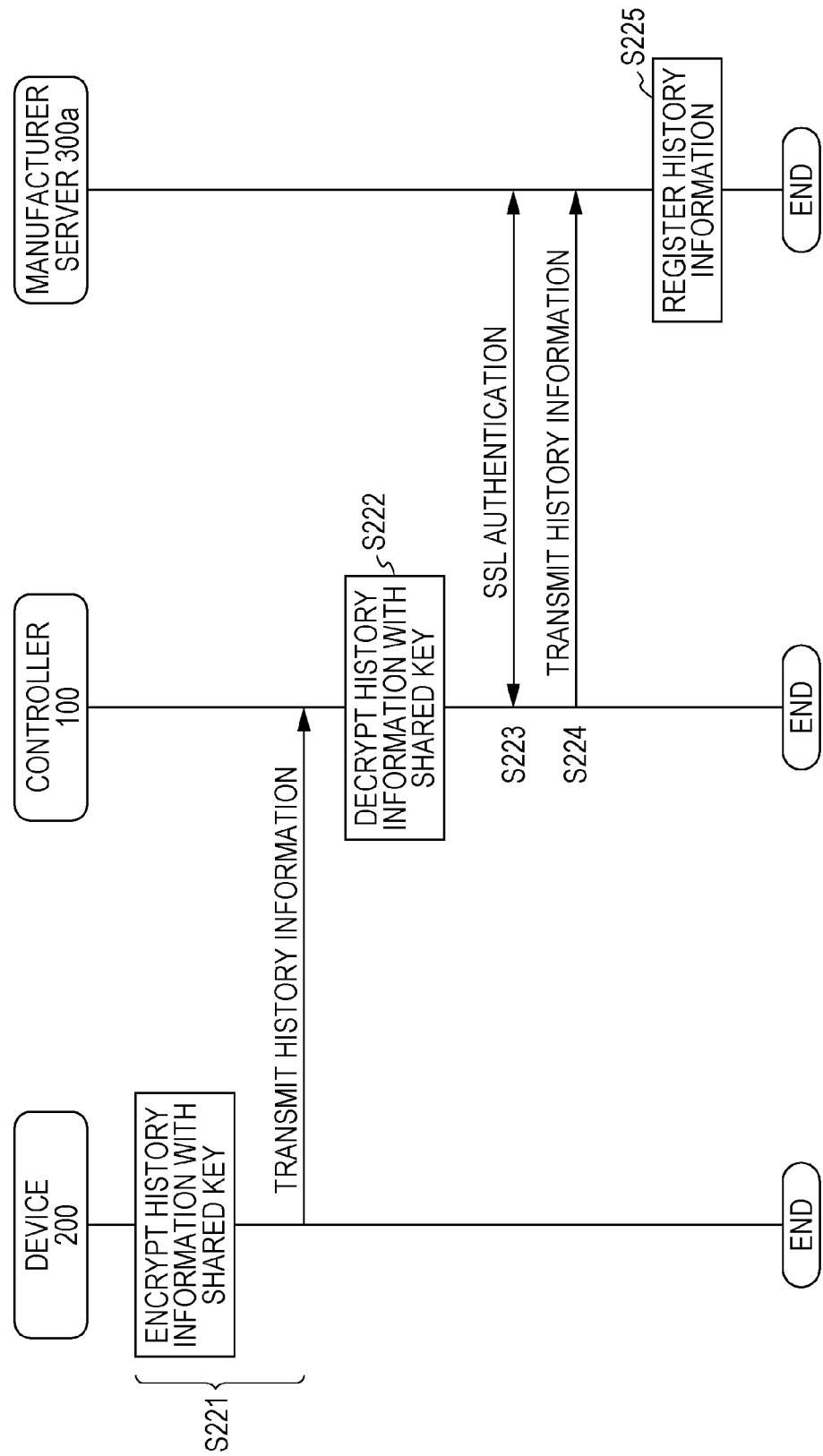
FIG. 22 is a sequence diagram for when performing transmission processing of device history information according to the second embodiment.

2.2.2 Operations Processing for Transmitting Device History Information from Device to Manufacturer Server 300a FIG. 22 illustrates a sequence of transmitting device history information from the device to the manufacturer server 300a. This uploading is performed periodically or non-periodically.

In S221, the device encrypts accumulated device history information using the shared key, and transmits to the controller along with the device ID.

In S222, the controller receives the device ID and encrypted device history information, searches for the shared key based on the device ID, and decrypts the device history information using the shared key.

In S223, the controller and manufacturer server 300a perform SSL authentication, and establish an encrypted communication path.

In S224, the controller transmits the controller ID and device ID received from the device and the device history information to the manufacturer server 300a.

In S225, the manufacturer server 300a registers the received controller ID, device ID, and device history information.

2.3 Advantages of Second Embodiment

Key exchange is performed when authenticating the device, and the shared key is used for challenge-response authentication in the second embodiment. The shared key can be generated from just the public key corresponding to the secret key, so if a device does not have the secret key corresponding to the public key of the public key certificate, the shared key cannot be generated, and challenge-response authentication will fail. Accordingly, authentication processing can be reduced as compared to authentication processing where signature generation using the secret key and signature verification using the public key are performed. Encrypted communication of the device history information can be performed by the shared key, so leakage of device history information can be prevented.

Third Embodiment

3. System Configuration

An authentication system 20 according to the present disclosure will be described as an embodiment of the present disclosure, with reference to the drawings.

3.1 Overall Configuration of Authentication System 20

Figure 23:
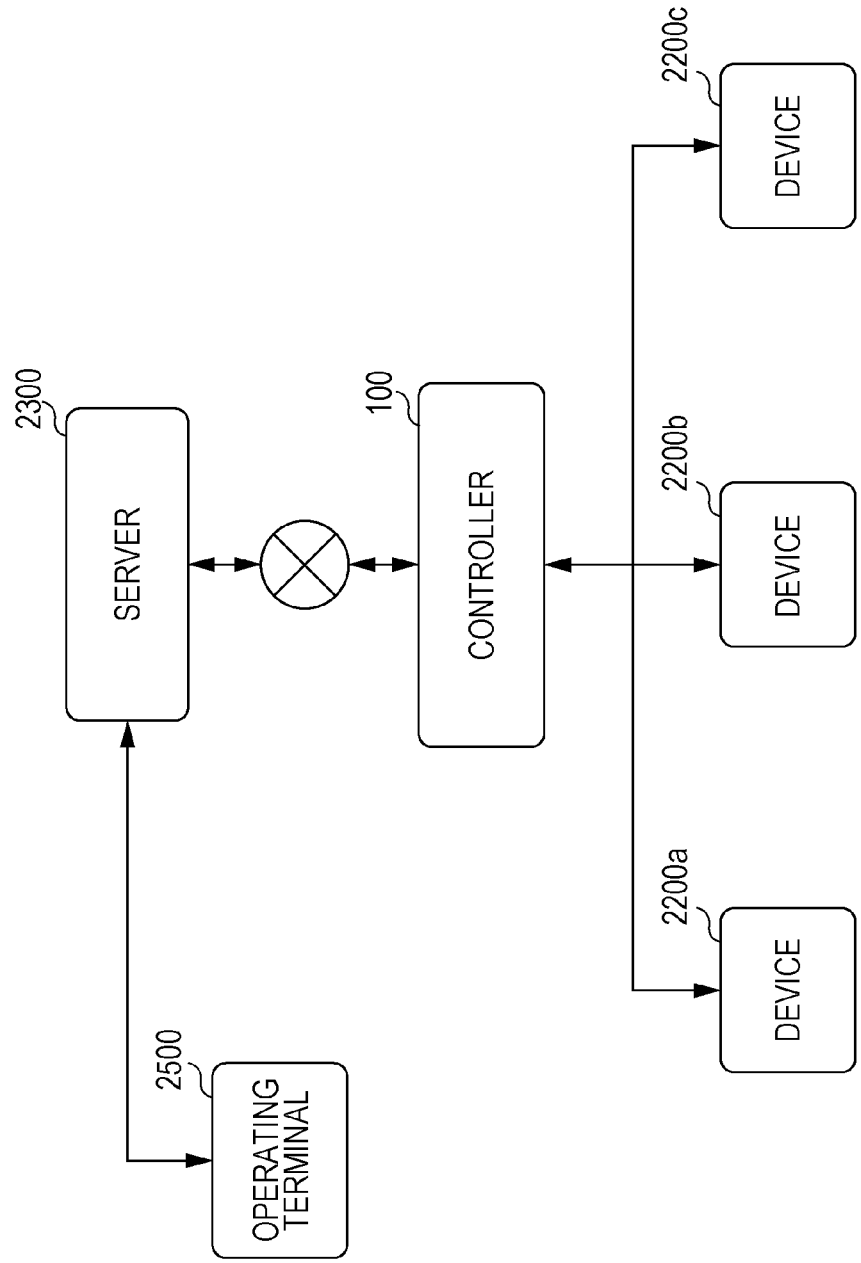
FIG. 23 is an overall configuration diagram of an authentication system according to a third embodiment.

FIG. 23 is a diagram illustrating the overall configuration to an authentication system 20 according to the present embodiment. The authentication system 20 is configured including a controller 100, devices 2200, a server 2300, and an operating terminal 2500. Components having the same configuration as those in the first embodiment are denoted by the same reference numerals, and description will be omitted.

The devices 2200a through 2200c are home electric appliances and housing facility devices that collect device history information, such as televisions, recorders, air conditioners, refrigerators, batteries, and so forth. The server 2300 is a manufacturer server of a manufacturer that manufactures the home electric appliances, or a service server of a service provider that provides services. As a specific example, a command to control a device within the home is transmitted from the service of the manufacturer server to the controller, and the controller controls the device based on the control command. A specific example of a control command is turning the power of the device on and off, setting a timer, or the like. The operating terminal 2500 is a device that has functions of operating home electric appliances and housing facility device, and functions of communication with servers, such as smartphones, cellular phones, and so forth.

3.2 Configuration of Controller 100

The controller 100 according to the third embodiment is the same as in the first embodiment, and accordingly description thereof will be omitted here.

3.3 Configuration of Device 2200

Figure 24:
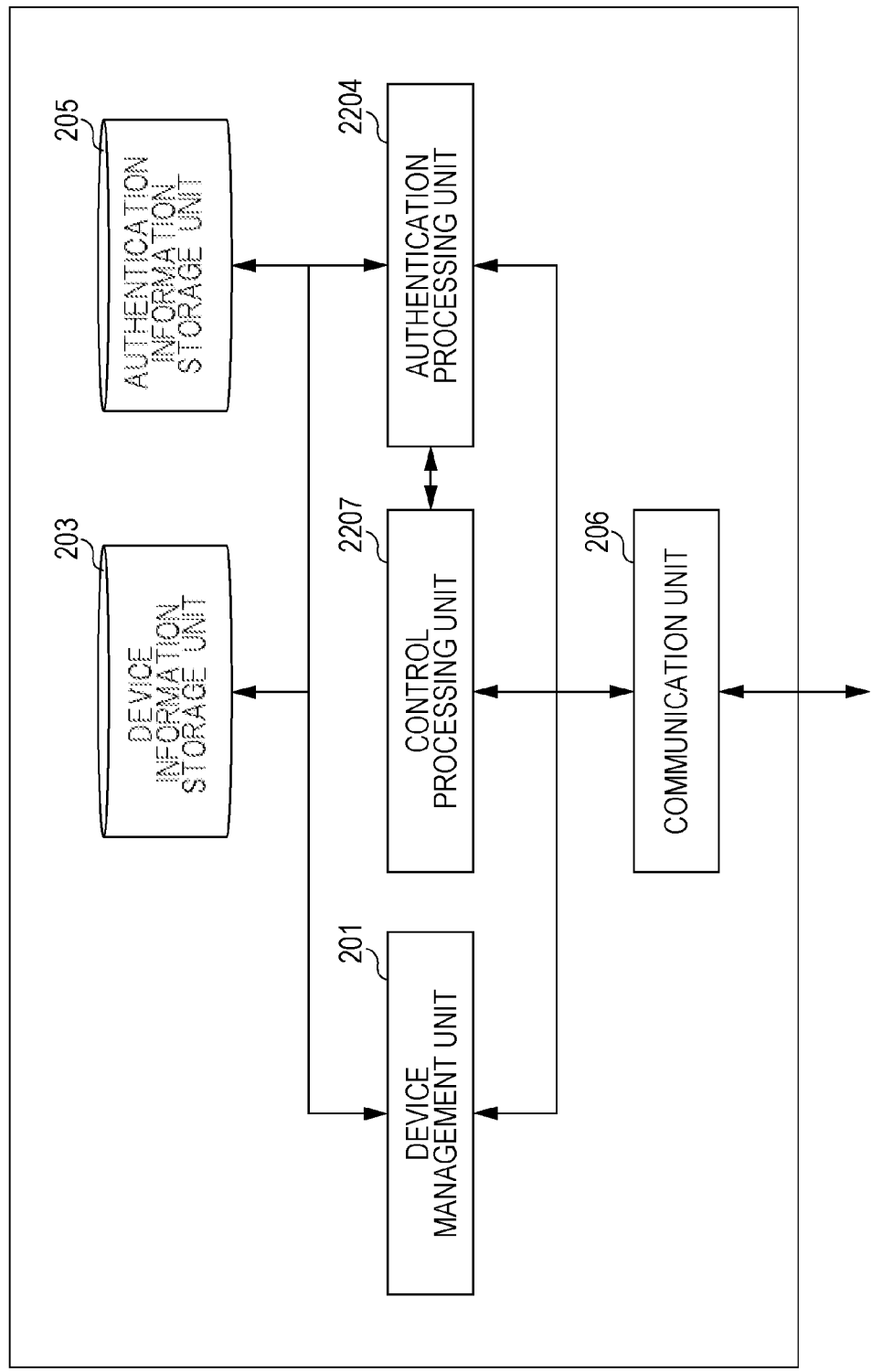
FIG. 24 is a configuration diagram of a device according to the third embodiment.

FIG. 24 is a configuration diagram of the device 2200. The device 2200 includes a device management unit 201, a device information storage unit 203, an authentication processing unit 2204, an authentication information storage unit 205, a communication unit 206, and a control processing unit 2207. Components having the same configuration as those in the first embodiment are denoted by the same reference numerals, and description will be omitted.

The authentication processing unit 2204 performs authentication processing with the controller 100. Also, upon receiving an authentication request from the device management unit 201 along with a public key certificate, the authentication processing unit 2204 acquires the CRL recorded in the authentication information storage unit 205, and verifies whether the certificate ID of the public key certificate of the controller 100 is recorded in the CRL. The authentication processing unit 2204 also verifies the signature of the public key certificate using the public key (omitted from illustration) of the server 2300, which is the certificate authority. The authentication processing unit 2204 also generates a random number and transmits the random number to the controller 100. The authentication processing unit 2204 verifies a signature of the random number received from the controller 100. In a case where any one of the verifications fails, the authentication processing unit 2204 determines that the controller 100 is an unauthorized device. Also, in a case where a control command message has been notified from the control processing unit 2207, the authentication processing unit 2204 verifies the signature of the entire message, performs signature verification of the CRL, and confirms that the CRL is valid.

Upon receiving the control command message from the controller 100, the control processing unit 2207 requests the authentication processing unit 2204 for verification of the signature of the entire message that has been received, and the CRL signature. If the results of signature verification from the authentication processing unit 2204 are that verification has been successful, the content of control is executed following the contents of the control command.

Figure 28:
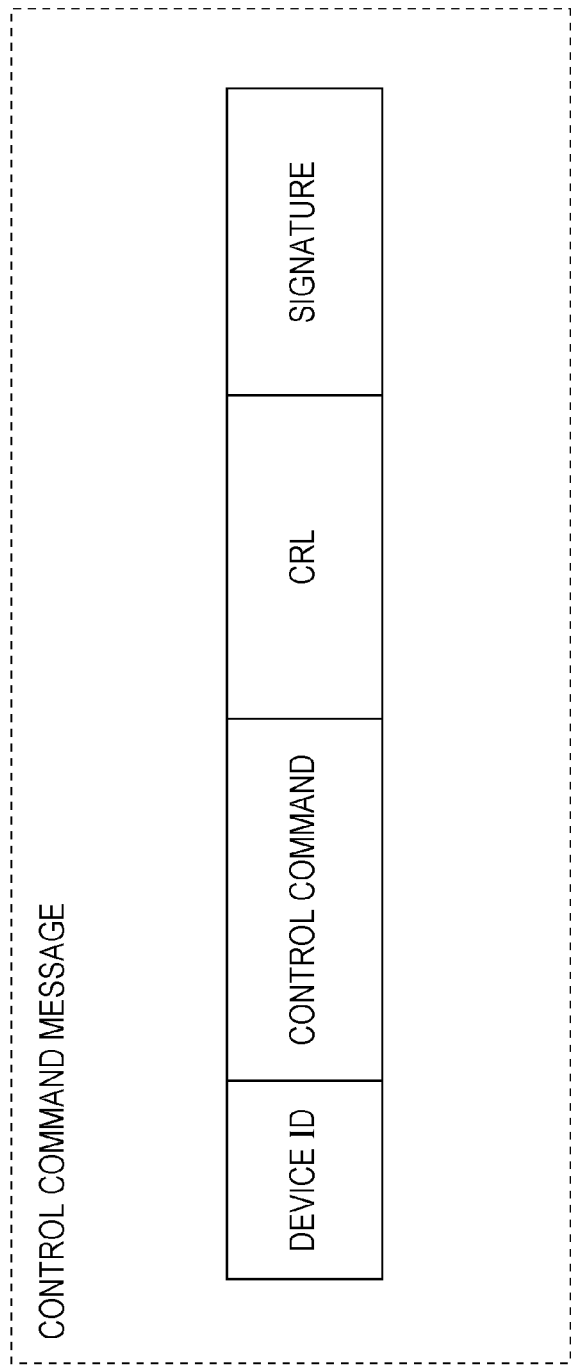
FIG. 28 is a diagram illustrating an example of a control command message according to the third embodiment.

FIG. 28 is a diagram illustrating an example of a control command message. The control command message is configured including a device ID indicating each device, a control command indicating the content of control which the device performs, the CRL illustrated in FIG. 5, and a signature by the server secret key for the entire message.

3.4 Configuration of Server 2300

Figure 25:
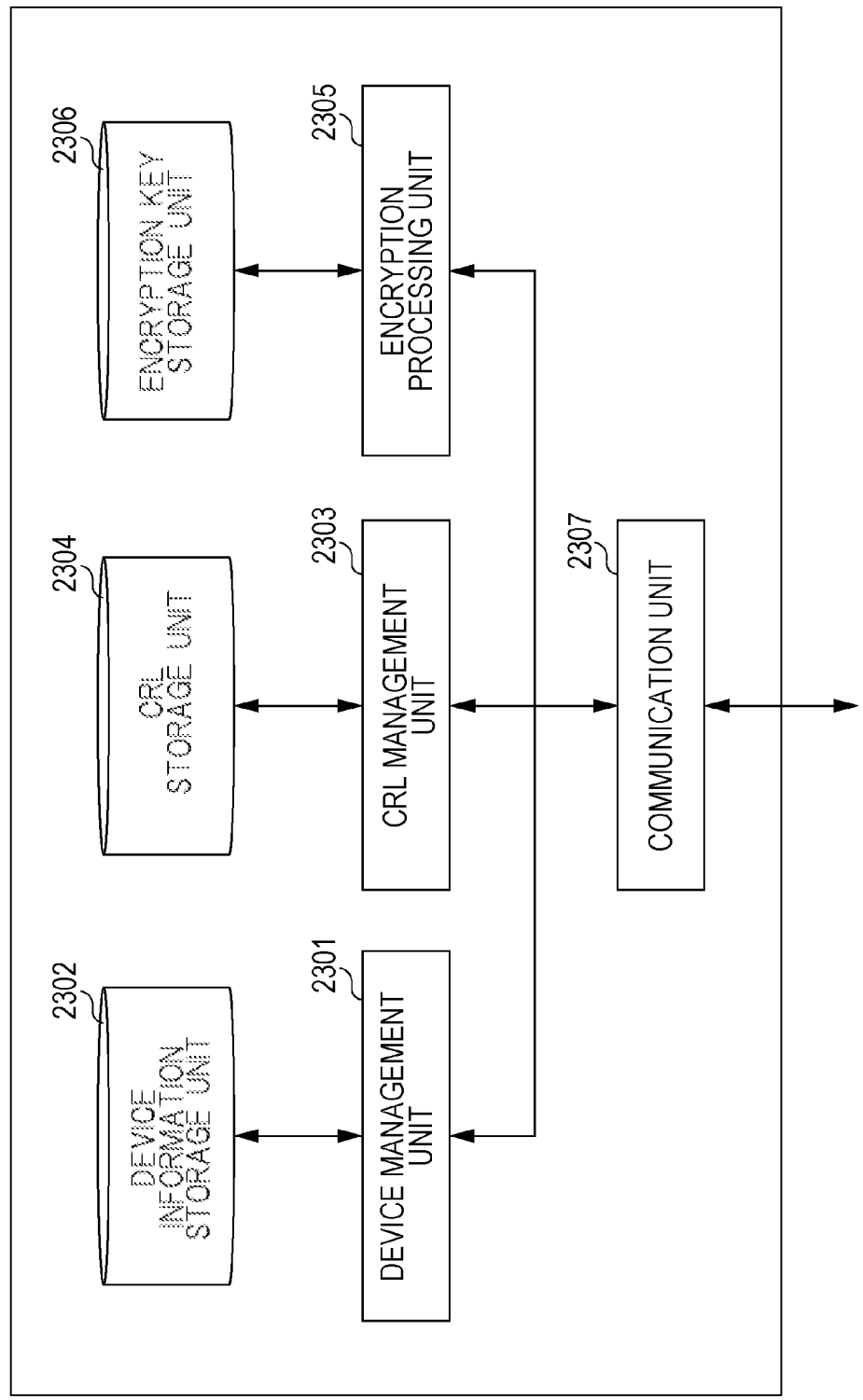
FIG. 25 is a configuration diagram of a server according to the third embodiment.

FIG. 25 is a configuration diagram of the server 2300. The server 2300 includes a device management unit 2301, a device information storage unit 2302, a CRL management unit 2303, a CRL storage unit 2304, an encryption processing unit 2305, an encryption key storage unit 2306, and a communication unit 2307.

The device management unit 2301 controls the device information storage unit 2302, and manages association between controllers and devices, IDs of controllers and devices being connected, and device history. Also, upon having detecting an unauthorized device or controller, the device management unit 2301 notifies the CRL management unit 2303 of the certificate ID of that device or controller, and places a CRL update request.

The device information storage unit 2302 records the IDs and certificate IDs of the controller and devices, and device history. An example of the device information management table which the device information storage unit 2302 holds is the same as the first embodiment, so description will be omitted.

The CRL management unit 2303 controls the CRL storage unit 2304, and in a case of having received a certificate ID of an unauthorized device or unauthorized controller from the device management unit 2301, sets data other than the signature of the CRL, and requests the encryption processing unit 2305 to generate the CRL signature. The CRL management unit 2303 receives the CRL regarding which the signature has been generated from the encryption processing unit 2305, and records in the CRL storage unit 2304.

Upon receiving the request to generate the signature from the CRL management unit 2303, the encryption processing unit 2305 generates the CRL signature using the secret key held in the encryption key storage unit 2306, and once the CRL signature is generated, transmits to the CRL management unit 2303.

The encryption key storage unit 2306 holds the CRL issuing secret key for the server 2300 which is the certificate authority. The CRL storage unit 2304 records the CRL.

The communication unit 2307 performs communication between the controller 100 and operating terminal 2500. SSL communication is performed for the communication between the controller 100 and operating terminal 2500. Certificates necessary for SSL communication are recorded at the communication unit 2307.

3.5 Configuration of Operating Terminal 2500

Figure 26:
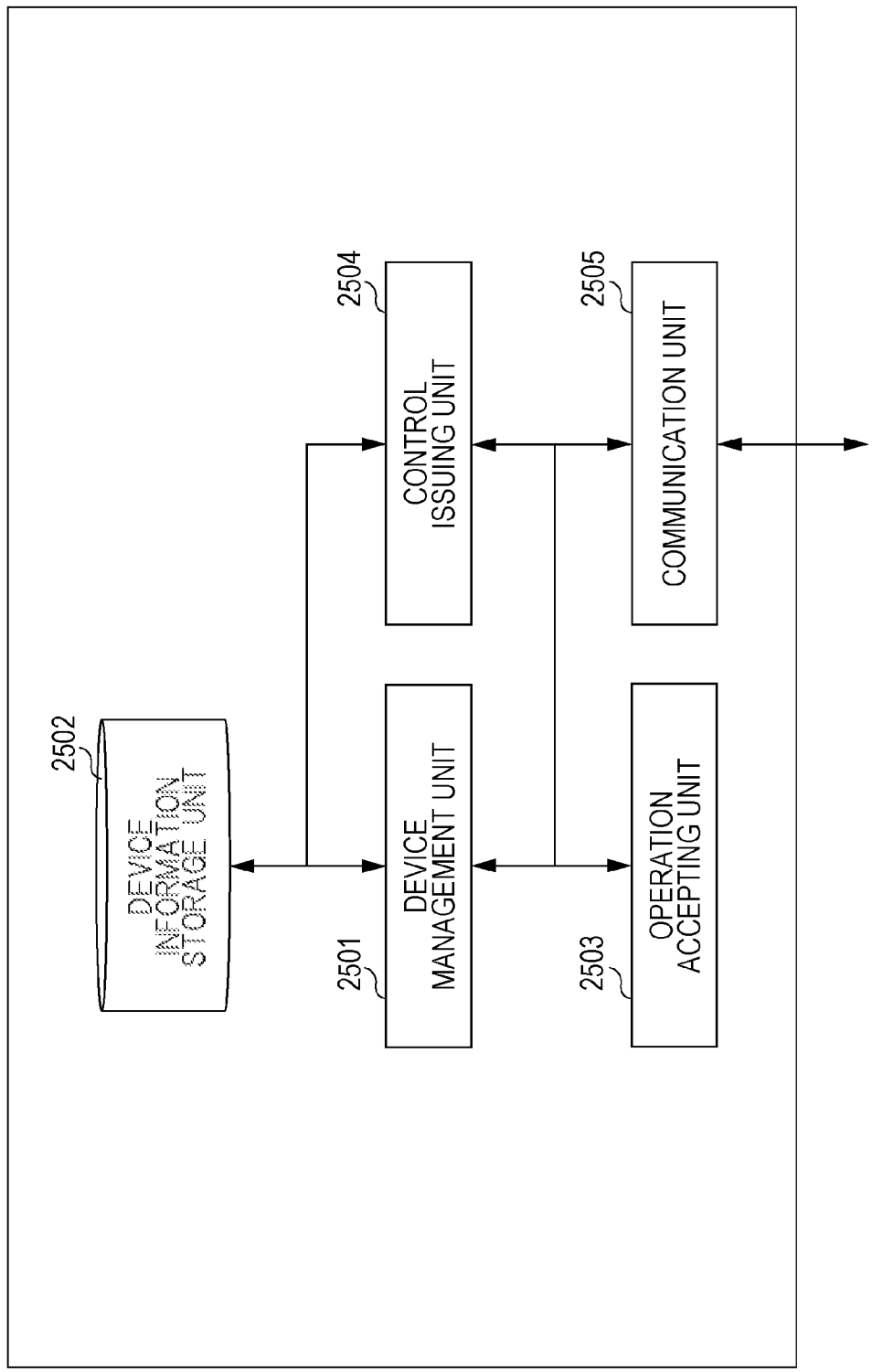
FIG. 26 is a configuration diagram of an operating terminal according to the third embodiment.

FIG. 26 is a configuration diagram of the operating terminal 2500. The operating terminal 2500 includes a device management unit 2501, a device information storage unit 2502, an operation accepting unit 2503, a control issuing unit 2504, and a communication unit 2505.

The device management unit 2501 controls the device information storage unit 2502 to manage the IDs of devices to be controlled, and control commands representing the contents of control which can be issued for each device ID. The device management unit 2501 selects device IDs based on what has been received by notification from the operation accepting unit 2503. The device information storage unit 2502 records the IDs of devices to be controlled, and control commands.

FIG. 27 is a diagram illustrating an example of a controlled device management table which the device information storage unit 2502 holds. The controlled device management table records device IDs and corresponding control commands. Control commands which can be issued for each device ID are managed as control commands. An example of using the device IDs and control command table is information used for configuring a graphic user interface (GUI) for presenting the user with available control for each device ID.

The operation accepting unit 2503 receives operations from the user handling the operating terminal, and notifies the device management unit 2501 and control issuing unit 2504 of the content that has been accepted. Examples of operations from the user include, in addition to a method of using GUI, gestures, automatic operations by a timer set beforehand, and so forth.

The control issuing unit 2504 reads control commands from the controlled device management table based on the received contents notified from the operation accepting unit 2503, and issues the control commands. Note that a configuration may be made where the server has the controlled device management table instead of the operating terminal, with the service side issuing control commands by application programming interfaces (APIs) corresponding to the control commands from the operating terminal being called up.

The communication unit 2505 performs communication with the server 2300. The communication unit 2505 communicates with the server 2300 via SSL communication. Certificates necessary for SSL communication are recorded at the communication unit 2505.

3.6 Operations of Authentication System 20

Operations of the authentication system 20 include the following.
(1) Device registration processing where connection is made from device 2200 to controller 100, and registration is made in server 2300
(2) Processing to execute device control (processing to update CRL of device)

These will each be described below with reference to the drawings.

3.6.1 Operations at Time of Device Registration Processing

The operation sequence at the time of device registration according to the third embodiment is the same as the first embodiment, and accordingly description thereof will be omitted here. Note that the manufacturer server in FIGS. 11 and 12 is equivalent to the server 2300 in the present embodiment.

3.6.2 Operations to Execute Device Control (Processing to Update CRL of Device)

Figure 29:
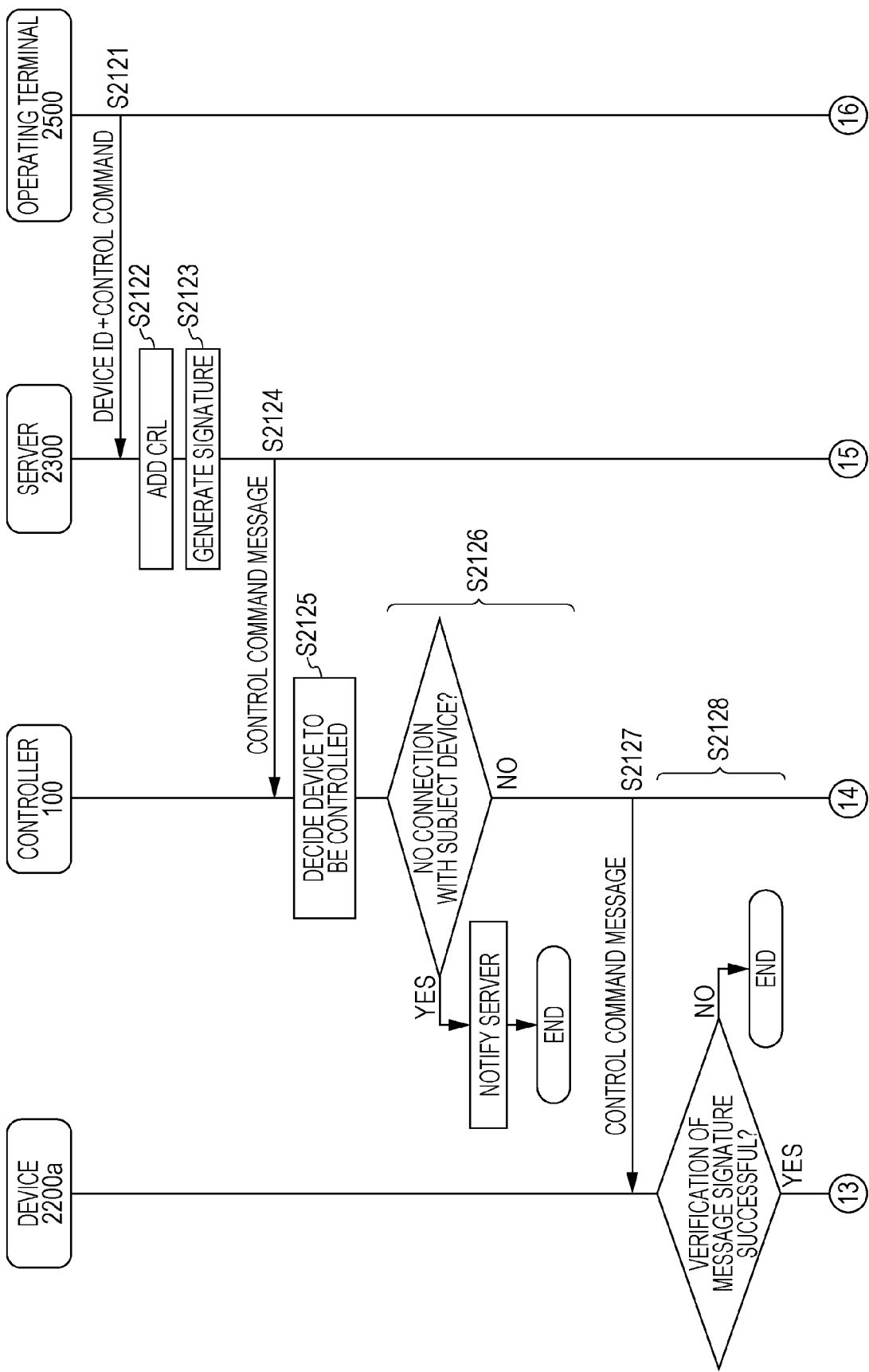
FIG. 29 is a sequence diagram for when executing device control according to the third embodiment.
Figure 30:
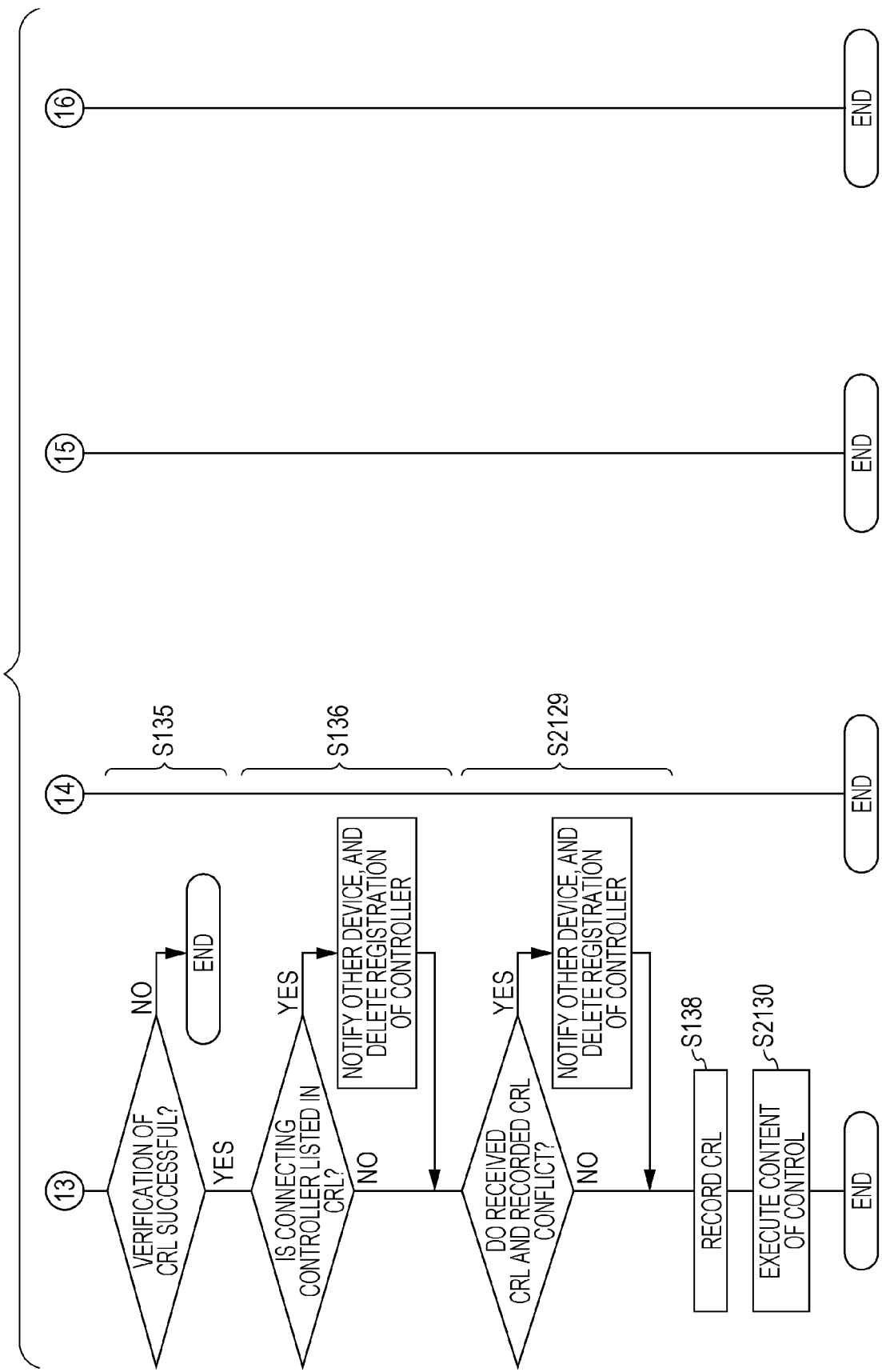
FIG. 30 is a sequence diagram for when executing device control according to the third embodiment.

FIGS. 29 and 30 illustrate a sequence of executing device control from the operating terminal 2500 to the device 2200a, and at the same time updating the CRL of the device 2200a. Processing performed as to the device 2200b and device 2200c from the operating terminal 2500 is the same. Sequences performing the same processing as in the first embodiment will be denoted with the same reference numerals and description will be omitted.

In S2121, the operating terminal 2500 transmits a device ID and control command to the server 2300.

In S2122, the server 2300 adds a CRL to the device ID and control command.

In S2123, the server 2300 uses the secret key to generate a signature for the entire message obtained by linking the device ID, control command, and CRL, and adds. This will be referred to as a control command message.

In S2124, the server 2300 transmits the control command message to the controller 100.

In S2125, the controller 100 acquires the device ID from the received control command message, compares with the device ID listed in the device information management table, and decides the destination for transmitting the control command message to.

In S2126, if the device ID to be controlled is not included in the device IDs listed in the device information management table which is managed, the controller 100 notifies the server 2300 to the effect that the control command message could not be transmitted, and the processing ends.

In S2127, the controller 100 transmits the control command message to the device 2200a.

In S2128, the device 2200a verifies the signature attached to the control command message to verify the validity of the received control command message. In a case where the verification fails, the device 2200a ends without executing the device control processing and updating processing of the CRL.

S135 and S136 are the same as the first embodiment, so description will be omitted.

In S2129, the device 2200c compares the CRL received from the operating terminal 2500 and the CRL in the authentication information storage unit 205, and verifies whether or not there is inconsistency. Specifically, in a case where a CRL has been recorded in the control command message received from the operating terminal 2500, comparison is made between the issue date of the CRL received from the operating terminal 2500 and the next issue date of the CRL received from the controller 100. In a case where the next issue date of the CRL received from the controller 100 is before the issue date of the CRL received from the operating terminal 2500, determination is made that the next issue date of the CRL received from the controller 100 has passed, so the controller 100 is detected as an unauthorized controller since it did not update the CRL. Also, the versions of the CRLs received from the controller 100 and the operating terminal 2500 are compared, and if the CRL version do not match, the controller 100 which transmitted the older version CRL is detected as an unauthorized controller since it did not update the CRL. At this time, the device 2200a notifies the other devices and controllers of detection of an unauthorized controller. Registration of this unauthorized controller is deleted from the connecting controller management table as well. Connection with the controller 100 is also cut off.

S138 is the same as the first embodiment, so description will be omitted.

In S2130, the device 2200a executes control as to the device in accordance with the control command.

3.7 Advantages of Third Embodiment

In the third embodiment, a device receives a CRL along with a control command. Accordingly, though a device connected to an unauthorized controller could not update the CRL, the device can acquire the newest CRL along with the control command, and updating can be performed. Enabling updating of the CRL enables connection to unauthorized controllers to be prevented, and safe connection to be realized among authorized controllers and devices.

Fourth Embodiment

4. System Configuration

An authentication system 30 according to the present disclosure will be described as an embodiment of the present disclosure, with reference to the drawings.

4.1 Overall Configuration of Authentication System 30

Figure 31:
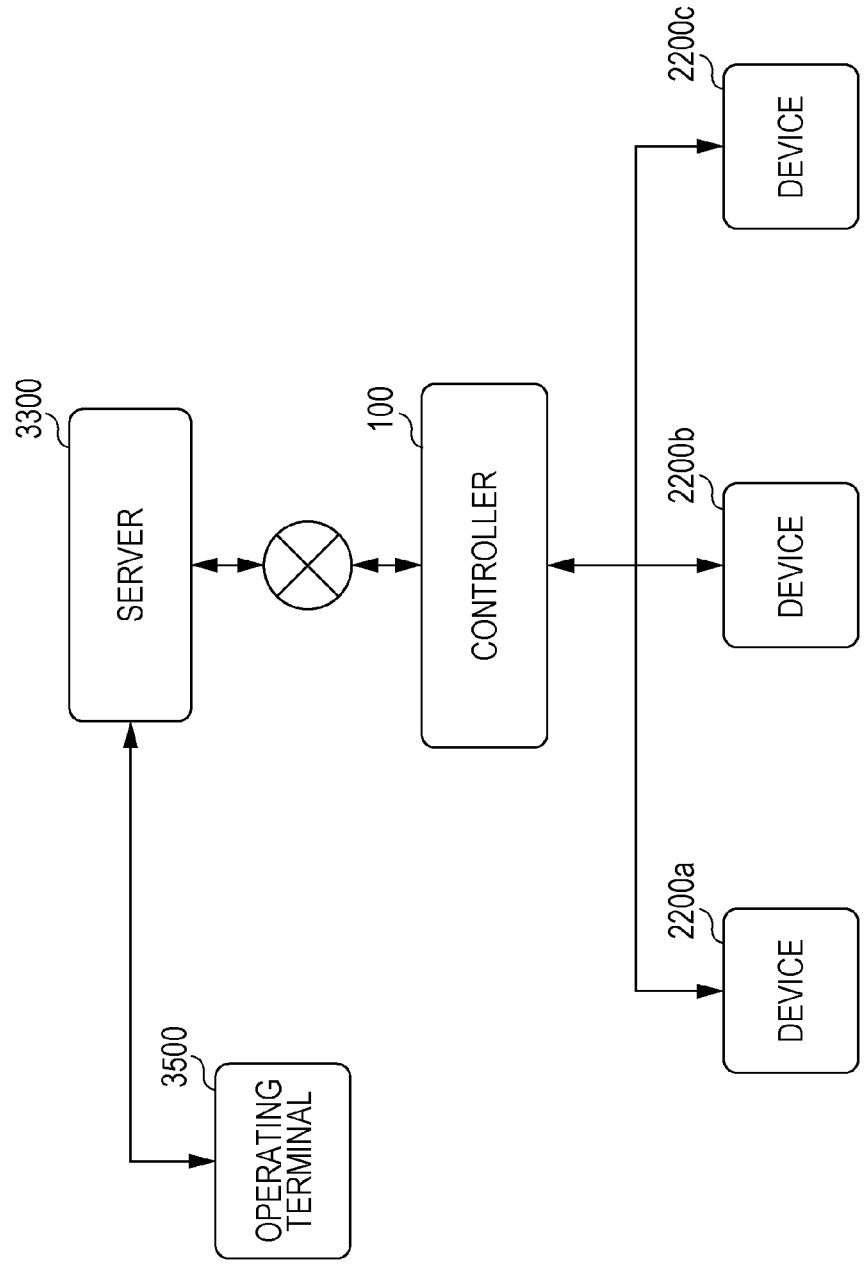
FIG. 31 is an overall configuration diagram of an authentication system according to a fourth embodiment.

FIG. 31 is a diagram illustrating the overall configuration of the authentication system 30 according to the present disclosure. The authentication system 30 is configured including a controller 100, a device 2200, a server 3300, and an operating terminal 3500. Components having the same configuration as those in the first embodiment and third embodiment are denoted by the same reference numerals, and description will be omitted.

The operating terminal 3500 is a device that has functions of operating home electric appliances and housing facility devices, and functions of communication with servers 3300, such as smartphones, cellular phones, and so forth.

4.2 Configuration of Controller 100

The controller 100 according to the fourth embodiment is the same as in the first embodiment, and accordingly description thereof will be omitted here.

4.3 Configuration of Device 2200

The device 2200 according to the fourth embodiment is the same as in the third embodiment, and accordingly description thereof will be omitted here.

4.4 Configuration of Server 3300

The server 3300 according to the fourth embodiment is the same as in the third embodiment, and accordingly description thereof will be omitted here.

4.5 Configuration of Operating Terminal 3500

Figure 32:
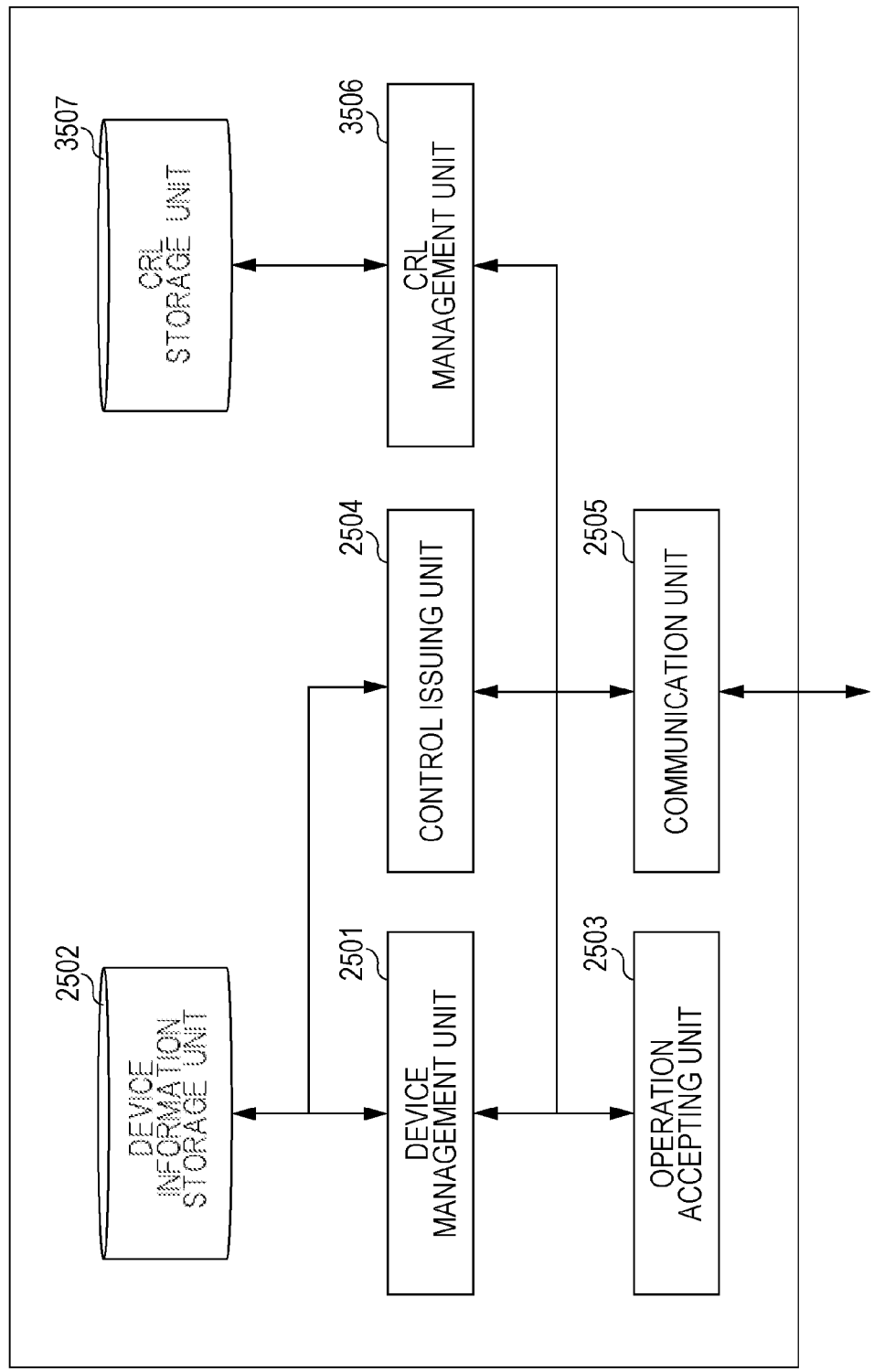
FIG. 32 is a configuration diagram of an operating terminal according to the fourth embodiment.

FIG. 32 is a configuration diagram of the operating terminal 3500. The operating terminal 3500 is configured including the device management unit 2501, device information storage unit 2502, operation accepting unit 2503, control issuing unit 2504, communication unit 2505, and a CRL management unit 3506 and a CRL storage unit 3507. Components having the same configuration as those in the first embodiment and third embodiment are denoted by the same reference numerals, and description will be omitted.

The CRL management unit 3506 controls the CRL storage unit 3507, and in a case of receiving a CRL from the device information management unit, updates the CRL. The CRL storage unit 3507 records the issued CRL.

4.6 Operations of Authentication System 30

Operations of the authentication system 30 include the following.

(1) Device registration processing where connection is made from device to controller, and registration is made in server
(2) Processing to update CRL of operating terminal
(3) Processing to execute device control (processing to update CRL of device)

These will each be described below with reference to the drawings.

4.6.1 Operations at Time of Device Registration Processing

The operation sequence at the time of device registration according to the fourth embodiment is the same as the first embodiment, and accordingly description thereof will be omitted here. Note that the manufacturer server 300a in FIGS. 11 and 12 is equivalent to the server 3300 in the present embodiment.

4.6.2 Processing to Update CRL of Operating Terminal

Figure 33:
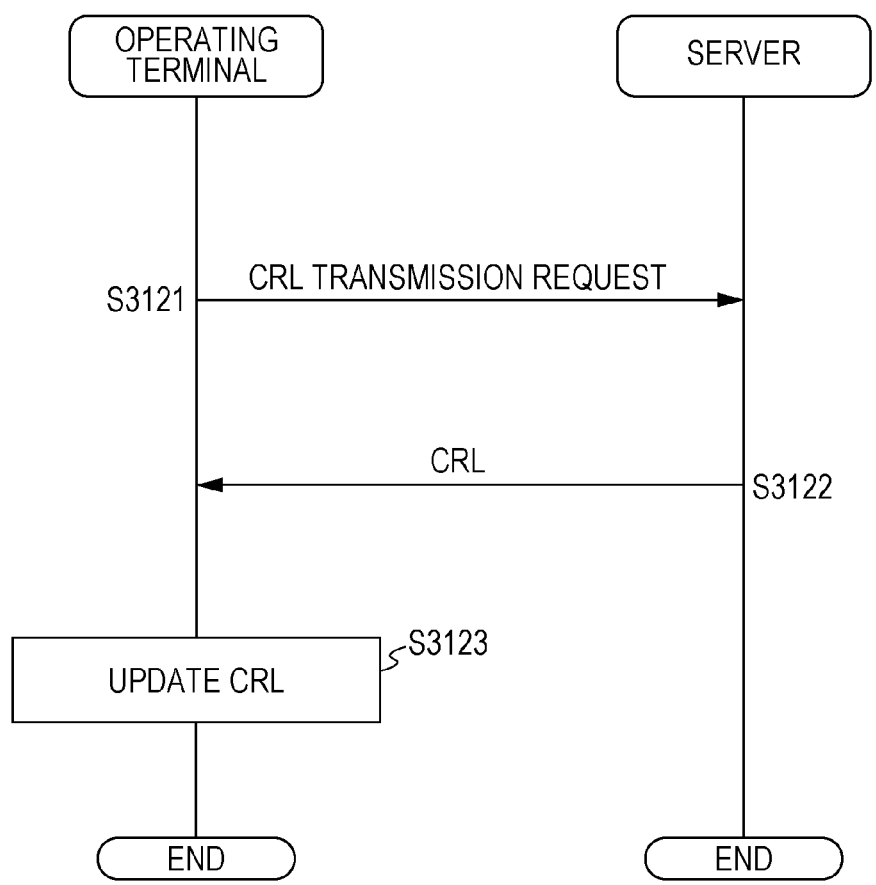
FIG. 33 is a sequence diagram for when updating a CRL of the operating terminal according to the fourth embodiment.

FIG. 33 illustrates a sequence of updating the CRL of the operating terminal. In S3121, the operating terminal transmits a CRL transmission request to the server which is the certificate authority.

In S3122, the server transmits the CRL being managed to the operating terminal.

In S3123, the operating terminal records the received CRL in the CRL storage unit, and updates to the newest CRL.

The timing at which the operating terminal transmits the CRL transmission request may be periodically according to a timing decided beforehand. Alternatively, this may be performed a the same time as, or before or after, a particular event where communication occurs with a server decided beforehand. An example of a particular event decided beforehand may be before a timing of executing device control.

4.6.3 Processing to Execute Device Control (Processing to Update CRL of Device)

Figure 34:
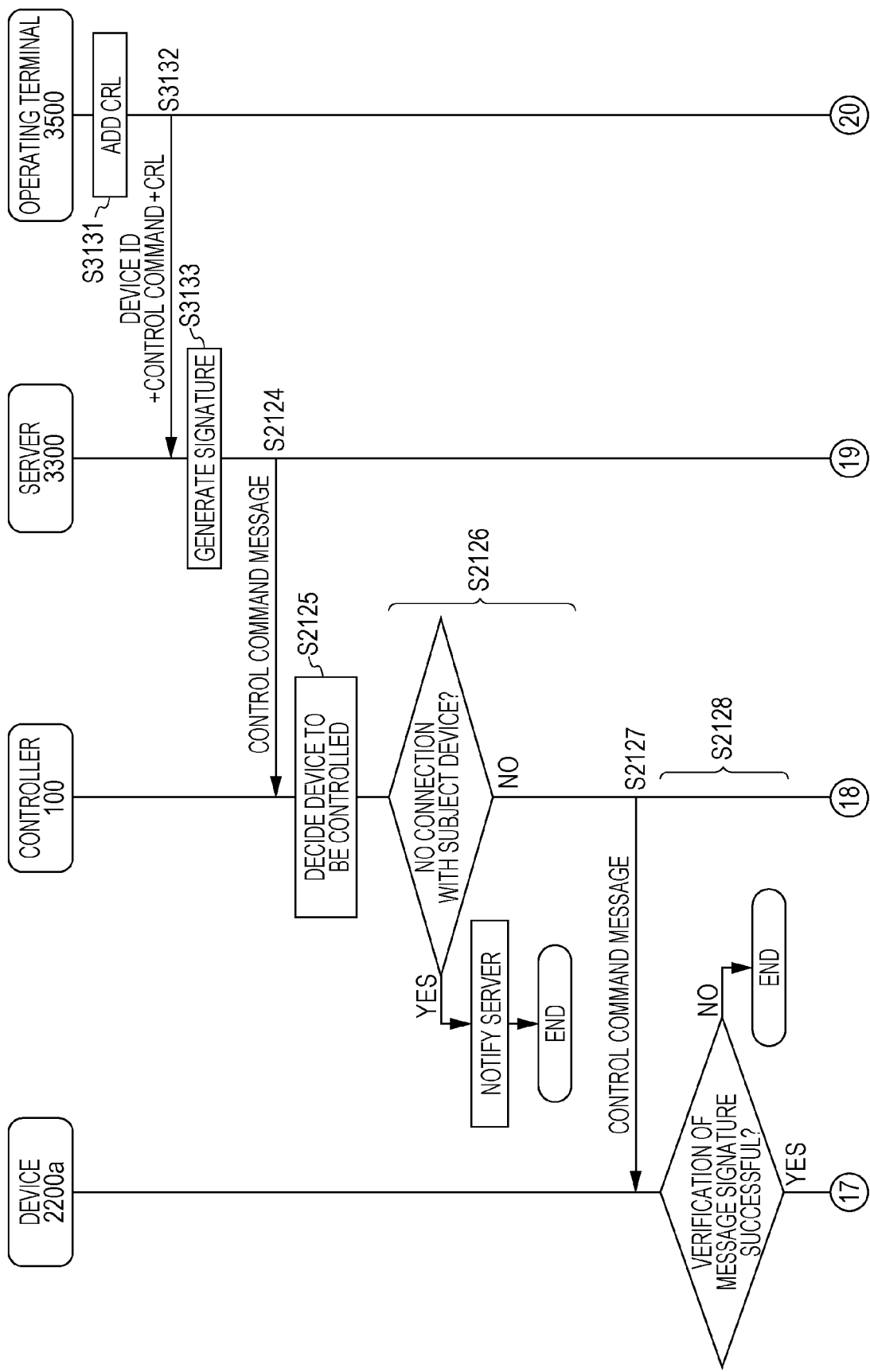
FIG. 34 is a sequence diagram for when executing device control according to the fourth embodiment.
Figure 35:
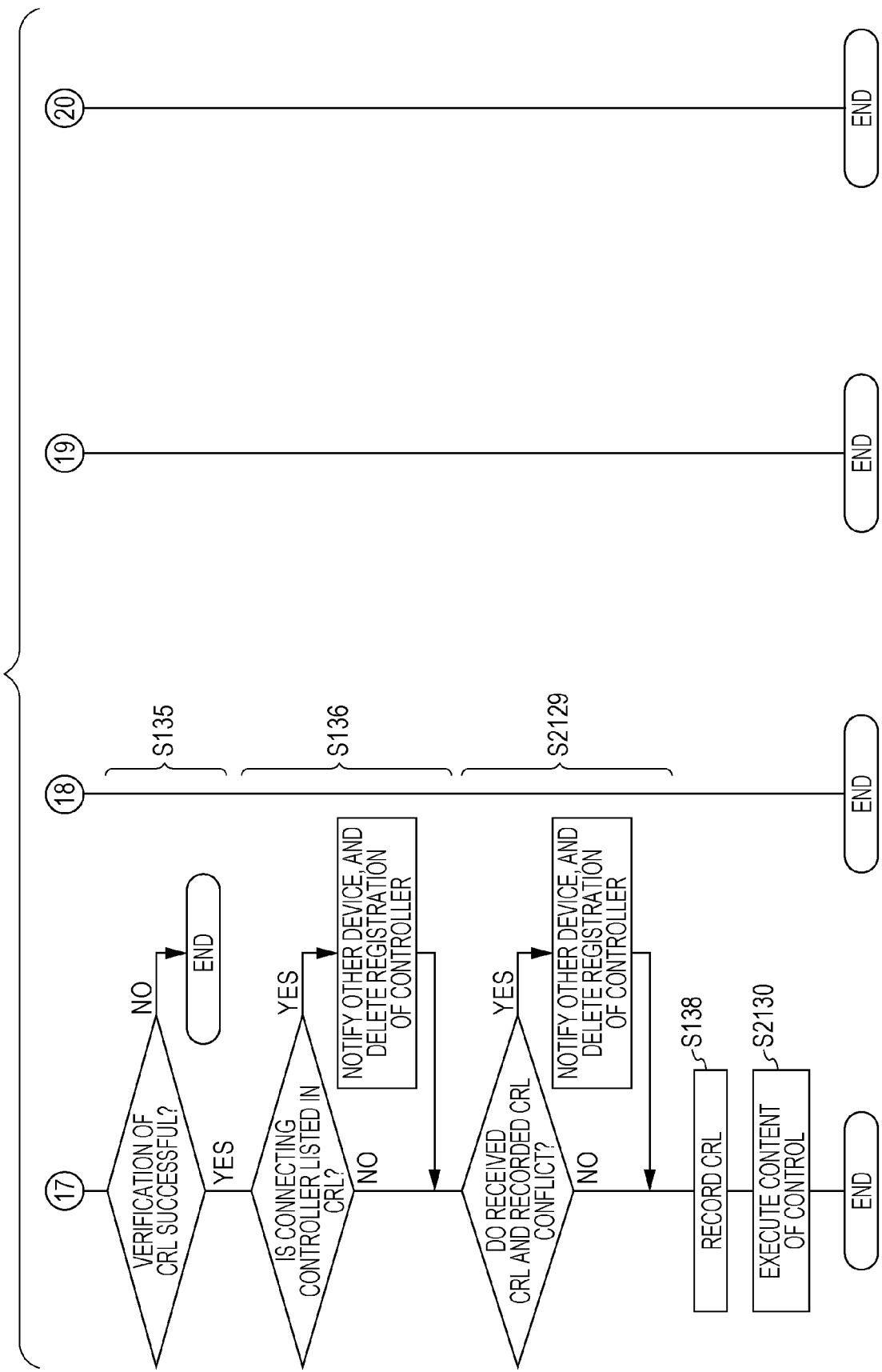
FIG. 35 is a sequence diagram for when executing device control according to the fourth embodiment.

FIGS. 34 and 35 illustrate a sequence of executing device control from the operating terminal to the device 2200a, and at the same time updating the CRL of the device 2200a. Processing performed as to the device 2200b and device 2200c from the operating terminal is the same. Operations performing the same processing as in the first embodiment and third embodiment will be denoted with the same numerals and description will be omitted.

In S3131, the operating terminal adds the CRL to the terminal ID and control command.

In S3132, the operating terminal transmits the terminal ID, control command, and CRL to the server.

In S3133, the server uses the secret key to generate a signature for the entire message obtained by linking the device ID, control command, and CRL, and adds. This will be referred to as a control command message.

S2124 through S2128, S135, S136, S2129, S138, and S2130 are the same as the first and third embodiments, so description will be omitted.

4.7 Advantages of Fourth Embodiment

In the fourth embodiment, a device receives a CRL along with a control command. Accordingly, though a device connected to an unauthorized controller could not update the CRL, the device can acquire the newest CRL along with the control command, and updating can be performed. Enabling updating of the CRL enables connection to unauthorized controllers to be prevented, and safe connection to be realized among authorized controllers and devices.

Fifth Embodiment

5. System Configuration

An authentication system 40 according to the present disclosure will be described as an embodiment of the present disclosure, with reference to the drawings.

5.1 Overall Configuration of Authentication System 40

Figure 36:
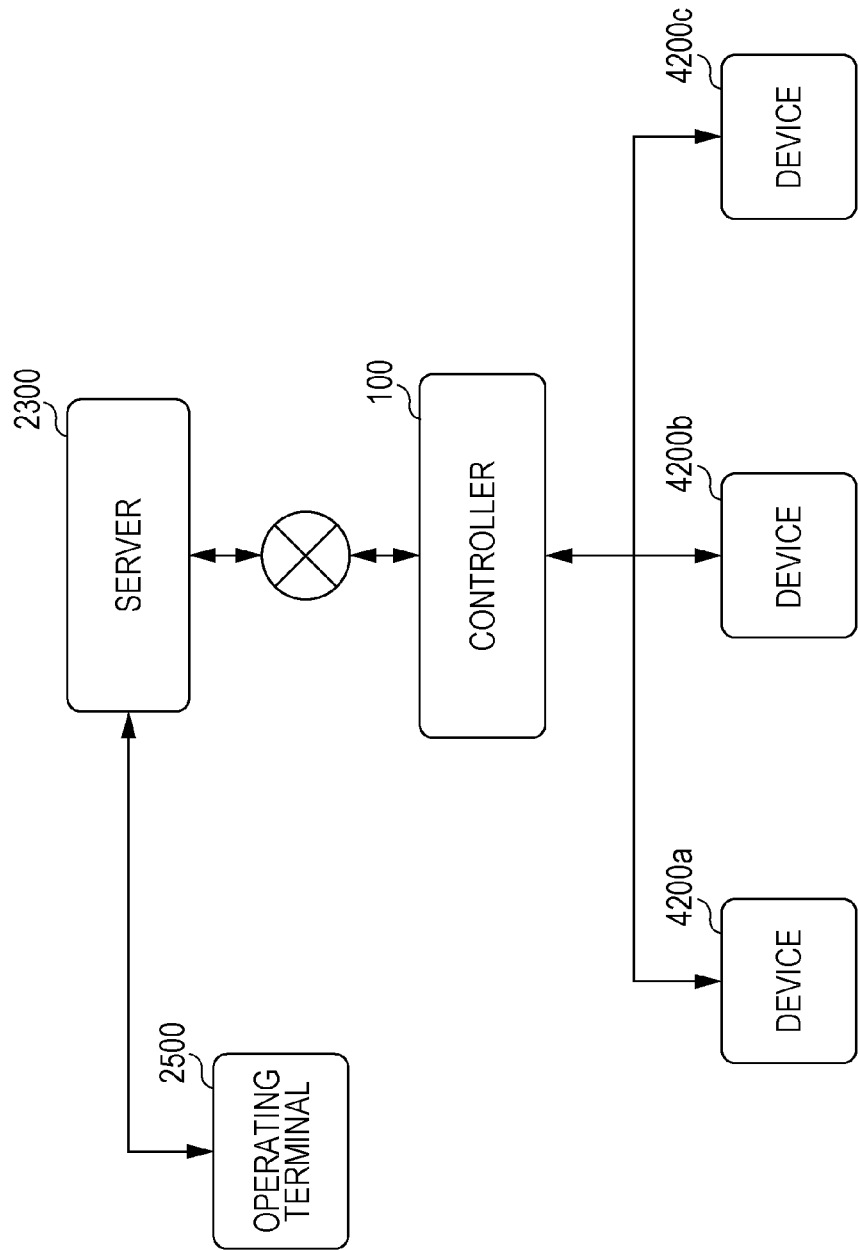
FIG. 36 is an overall configuration diagram of an authentication system according to a fifth embodiment.

FIG. 36 is a diagram illustrating the overall configuration of the authentication system 40 according to the present disclosure. The authentication system 40 is configured including a controller 100, devices 4200, a server 2300, and an operating terminal 2500. Components having the same configuration as those in the first embodiment and third embodiment are denoted by the same reference numerals, and description will be omitted.

The devices 4200a through 4200c are home electric appliances and housing facility devices that collect device history information, such as televisions, recorders, air conditioners, refrigerators, batteries, and so forth.

5.2 Configuration of Controller 100

The controller 100 according to the fifth embodiment is the same as in the first embodiment, and accordingly description will be omitted here.

5.3 Configuration of Device 4200

Figure 37:
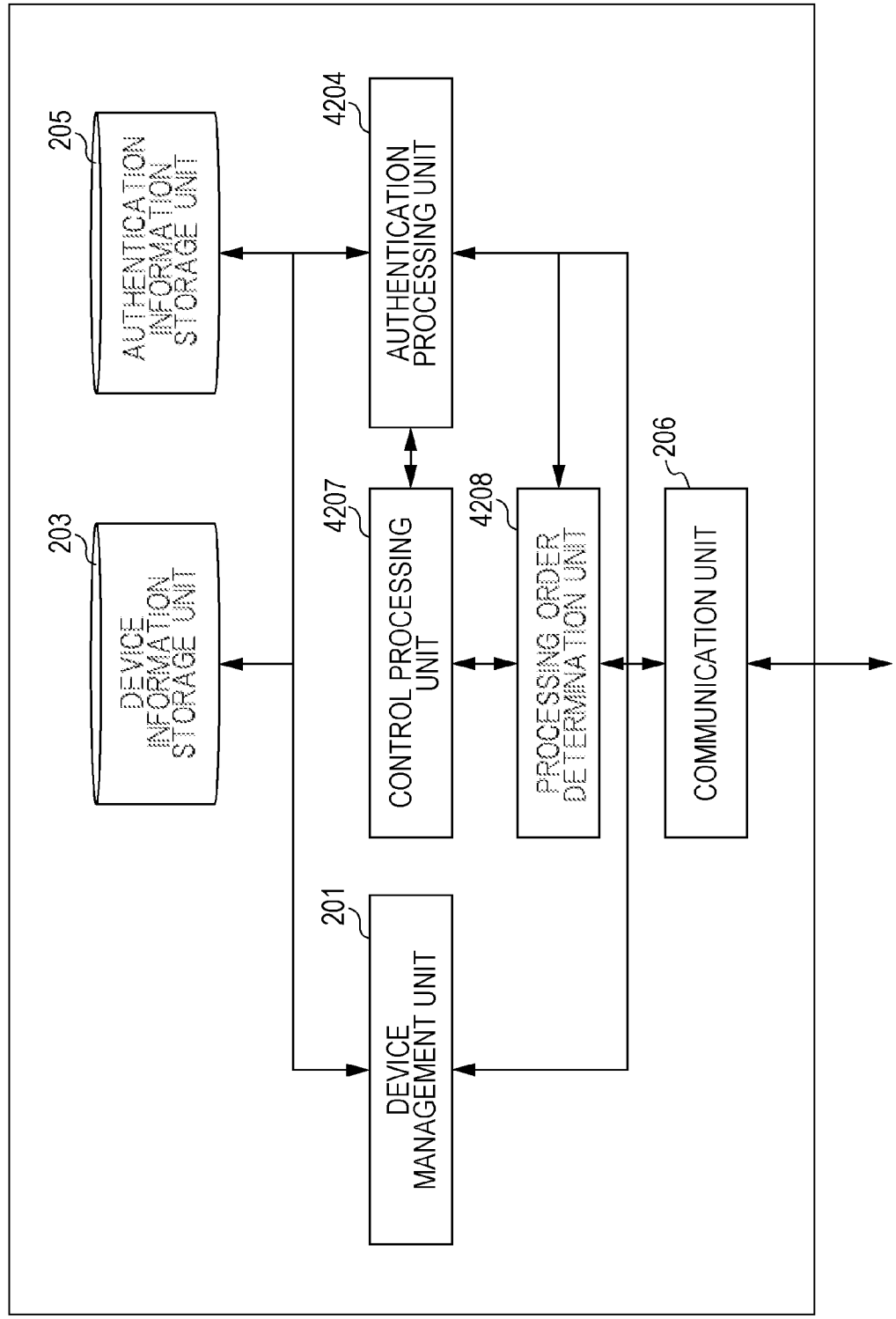
FIG. 37 is a configuration diagram of a device according to the fifth embodiment.

FIG. 37 is a configuration diagram of a device 4200. The device 4200 is configured including the device management unit 201, the device information storage unit 203, an authentication processing unit 4204, the authentication information storage unit 205, the communication unit 206, a control processing unit 4207, and a processing order determination unit 4208. Components having the same configuration as those in the first embodiment are denoted by the same reference numerals, and description will be omitted.

The authentication processing unit 4204 performs authentication processing with the controller 100. Also, upon receiving an authentication request from the device management unit 201 along with a public key certificate, the authentication processing unit 4204 acquires the CRL recorded in the authentication information storage unit 4204, and verifies whether the certificate ID of the public key certificate of the controller 100 is recorded in the CRL. The authentication processing unit 4204 also verifies the signature of the public key certificate using the public key (omitted from illustration) of the server, which is the certificate authority. The authentication processing unit 4204 also generates a random number and transmits the random number to the controller 100. The authentication processing unit 4204 verifies a signature of the random number received from the controller 100. In a case where any one of the verifications fails, the authentication processing unit 4204 determines that the controller 100 is an unauthorized device. Also, in a case of having been notified with a control command message from the processing order determination unit 4208, the authentication processing unit 4204 verifies the signature of the entire message, performs signature verification of the CRL, and confirms that the CRL is valid.

Upon receiving the control command message from the processing order determination unit 4208, the control processing unit 4207 requests the authentication processing unit 4204 for verification of the signature of the signature included in the message that has been received. The control processing unit 4207 receives the results of signature verification from the authentication processing unit 4204, and if verification has been successful, the content of control is executed following the contents of the control command. FIG. 28 is a diagram illustrating an example of a control command message. The control command message is configured including a device ID indicating each device, a control command indicating the content of control which the device performs, the CRL illustrated in FIG. 5, and a signature by the server secret key for the entire message.

The processing order determination unit 4208 decides the order of whether to perform execution of the control command first, or whether to perform processing related to the CRL verification and comparison first, based on the content of the control command. In a case of performing execution of the control command first, the processing order determination unit 4208 notifies the control processing unit 4207 of the control command message. In a case of performing processing related to the CRL verification and comparison first, the processing order determination unit 4208 notifies the authentication processing unit 4204 of the control command message. For example, in a case of a control command to an air conditioner which is the device, to change the direction of breeze, the control processing unit 4207 executes the content of the control command before the processing of verifying the CRL. In a case of having performed the processing of verifying the CRL later, and the CRL is found to be not valid, the control processing unit 4207 handles this by cancelling the content of the control command executed earlier, or the like.

Note that processing relating to the CRL verification and comparison does not need to be performed, depending on the content of the control command included in the control command message. For example, in a case of performing processing such as turning the power off or the like, CRL verification processing will be performed next time the power is turned on, so this can be skipped.

5.4 Configuration of Server 2300

The server 2300 according to the fifth embodiment is the same as in the third embodiment, and accordingly description thereof will be omitted here.

5.5 Configuration of Operating Terminal 2500

The operating terminal 2500 according to the fifth embodiment is the same as in the third embodiment, and accordingly description thereof will be omitted here.

5.6 Operations of Authentication System 40

Operations of the authentication system 40 include the following.
(1) Device registration processing where connection is made from device to controller, and registration is made in server
(2) Processing to execute device control (processing to update CRL of device)

These will each be described below with reference to the drawings.
5.6.1 Operations at Time of Device Registration Processing
The operation sequence at the time of device registration according to the fifth embodiment is the same as the first embodiment, and accordingly description thereof will be omitted here. Note that the manufacturer server 300a in FIGS. 11 and 12 is equivalent to the server 2300 in the present embodiment.
5.6.2 Operations to Execute Device Control (Processing to Update CRL of Device)

Figure 38:
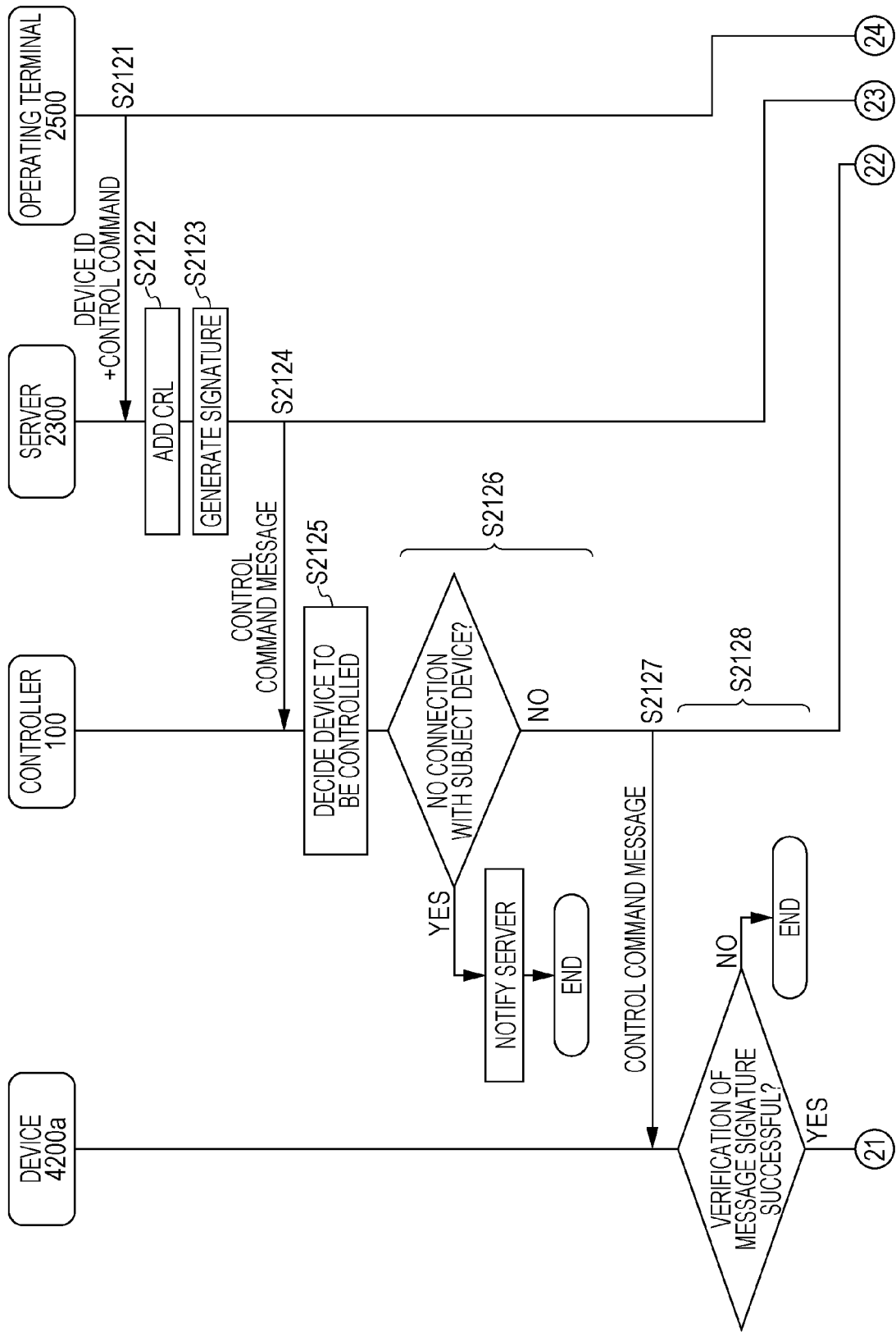
FIG. 38 is a sequence diagram for when executing device control according to the fifth embodiment.

FIGS. 38 and 39 illustrate a sequence of executing device control from the operating terminal to the device 4200a, and at the same time updating the CRL of the device 4200a. Processing performed as to the device 4200b and device 4200c from the operating terminal is the same. Sequences performing the same processing as in the first embodiment and third embodiment will be denoted with the same reference numerals and description will be omitted.

In S4121, the device 4200a determines whether or not to perform execution of the control command first, based on the content of the control command included in the control command message.

In a case of having determined to perform execution of the control command first, the device 4200a executes S2130, S4122 through S4124, and S138.

S2130 is the same as the third embodiment, so description will be omitted.

In S4122, the device 4200a verifies the received CRL signature. If the verification is not successful, the content of execution of control is cancelled, and the CRL updating processing ends.

In S4123, the device 4200a verifies whether or not the connecting controller is listed in the CRL. If the connecting controller is listed, the content of execution of control is cancelled, and detection of an unauthorized controller is notified to the other devices and controllers. The registration of this unauthorized controller is also deleted from the connecting controller management table.

In S4124, the device 4200c compares the CRL received from the operating terminal and the CRL in the authentication information storage unit, and verifies whether or not there is inconsistency. Specifically, in a case where a CRL has been recorded in the control command message received from the operating terminal, comparison is made between the issue date of the CRL received from the operating terminal and the next issue date of the CRL received from the controller. In a case where the next issue date of the CRL received from the controller is before the issue date of the CRL received from the operating terminal, determination is made that the next issue date of the CRL received from the controller has passed, so the controller is detected as an unauthorized controller since it did not update the CRL. Also, the versions of the CRLs received from the controller and the operating terminal are compared, and if the CRL version do not match, the controller which transmitted the older version CRL is detected as an unauthorized controller since it did not update the CRL. At this time, the content of execution of control is cancelled, and detection of an unauthorized controller is notified to the other devices and controllers. Registration of this unauthorized controller is deleted from the connecting controller management table as well. Connection with the controller is also cut off.

S138 is the same as the first embodiment, so description will be omitted.

Also, in a case of having determined not to perform control execution first, i.e., to perform processing relating to CRL verification and comparison first, the device 4200a executes S135 through S138, and S2130. This processing is the same as embodiments 1 and 3, so description will be omitted.

5.7 Advantages of Fifth Embodiment

In the fifth embodiment, a device receives a CRL along with a control command. Also, the order of implementation by authentication of CRL, and whether or not to implement, are switched according to the content of the control command. Accordingly, though a device connected to an unauthorized controller could not update the CRL, the device can acquire the newest CRL along with the control command, and updating can be performed. Further, the processing speed can be increased according to the content of the control command, and enabling updating of the CRL enables connection to unauthorized controllers to be prevented, and safe connection to be realized among authorized controllers and devices.

6. Other Modifications

Although the present disclosure has been described based on the above embodiments, it is needless to say that the present disclosure is not restricted to the above embodiment. The following arrangements are also included in the present disclosure.

(1) In the above embodiments, the controller may acquire a CRL from the server during the device registration processing. Acquisition may be periodically performed outside of device registration processing. Acquisition may also be performed before the server next issue date of the CRL.

(2) While the device communicates with the server via the controller to acquire a CRL in the above embodiments, this is not restrictive. The CRL may be acquired by an operating terminal connected to the server. Communication between the operating terminal and the device may be near field communication (NFC) or Bluetooth (a registered trademark) communication.

(3) Although other devices and controllers are notified when a device determines a controller to be unauthorized in the above embodiments, in a case where the devices or controllers that receive the notification have display functions, a display screen to the effect that an unauthorized controller has been detected may be output. Also, in a case where there is no display screen, an error code may be displayed or a lamp made to blink. Alternatively, the content of the control command may simply be ignore and not executed. Accordingly, the user having the unauthorized controller can confirm the display, and can replace the unauthorized controller.

(4) While challenge-response authentication using a shared key is performed in the above second embodiment, this is not restrictive, and Extensible Authentication Protocol Pre-Shared Key (EAP-PSK) may further be performed using the authentication method described in Request for Comments (RFC) 5191.

(5) The key for encrypted communication may be exchanged at the time of device registration processing in the above first embodiment. Diffie-Hellman (DH) or ECDH may be used as the key exchange method.

(6) In the above embodiments, the controller may display the power consumption of the devices to which connection is to be made, the amount of electric power charged in a battery, and the amount of power generated by a solar generator.

(7) The controller in the above embodiments may be a power distribution board installed in a home.

(8) Communication between the controller and device in the above embodiments may be Wi-Fi, Specified Low Power Wireless, Power Line Communication, or Bluetooth (a registered trademark).

(9) Although the function of the server as a certificate authority issuing CRLs and the function as a service server providing control commands are concurrently undertaken, this is not restrictive, and may be divided into separate servers.

(10) While CRLs are issued in the above embodiments including all certificate IDs of public key certificates of unauthorized controllers, this is not restrictive, and an arrangement may be made where CRLs are issued regarding just devices connecting to the server issuing the control command. Further, CRLs may be issued for each device type or each year of manufacture.

(11) In the above embodiments, the device ID and control command included in the control command message may be in a format conforming to a communication protocol such as ECHONET (a registered trademark) Lite or the like. Further, the CRL included in the control command message may be included in a control command issued in a format conforming to a communication protocol such as ECHONET (a registered trademark) Lite or the like. In the case of the ECHONET (a registered trademark) Lite protocol, a new property may be defined in the EPC region and actual CRL data be situated in the EDT region.

(12) The above devices specifically are computer systems configured including a microprocessor, read-only memory (ROM), random access memory (RAM), a hard disk unit, a display unit, a keyboard, a mouse, or the like. A computer program is recorded in the RAM or hard disk unit. The devices realize their functions by the microprocessor operating according to the computer program. The computer program here is configured by combining multiple command codes indicating instructions to the computer, to realize predetermined functions.

(13) Part or all of the components configuring the above devise may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program.

The parts of the components making up the above devices may be individually formed into one chip, or part or all may be included in one chip.

While description has been made regarding a system LSI, there are different names such as integrated circuit (IC), LSI, super LSI, and ultra LSI, depending on the degree of integration. The circuit integration technique is not restricted to LSIs, and dedicated circuits or general-purpose processors may be used to realize the same. A FPGA (Field Programmable Gate Array) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(14) Part or all of the components of which the above-described devices may be configured as an IC card detachably mountable to each device or a module. The IC card or standalone module is a computer system configured including a microprocessor, ROM, RAM, and so forth. The IC card or module may include the above-described super-multi-functional LSI. The IC card or module achieves its functions by the microprocessor operating according to the computer program. The IC card or module may be tamper-resistant.

(15) The present disclosure may be the above-described methods, or may be a computer program which realizes these methods by a computer, or may be digital signals made up of the computer program.

The present disclosure may be the computer program or the digital signals recorded in a computer-readable recording medium, such as for example, a flexible disk, a hard disk, a compact disc ROM (CD-ROM), magneto-optical (MO) disk, digital versatile disc (DVD), DVD-ROM, DVD-RAM, Blu-ray Disc (BD, a registered trademark), semiconductor memory, or the like. The present disclosure may also be the digital signals recorded in these recording mediums.

The present disclosure may be an arrangement where the computer program or the digital signals are transmitted over an electric communication line, wireless or cable communication line, a network such as the Internet or the like, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

(16) The above-described embodiment and the above-described modifications may be combined.

According to the present disclosure, in a system where a device and controller are connected, even if the device connects to an unauthorized controller, a CRL attached to a message controlling the device can be acquired, whereby the unauthorized controller can be detected.

What is claimed is:

1. An authentication method in an authentication system including a device, an operating terminal that operates the device, and a controller, where an authentication request from the device is authenticated by the controller, the method comprising:
   acquiring, by the device, a first certificate revocation list from the controller;
   after acquiring the first certificate revocation list, acquiring, by the device, a second certificate revocation list along with a control instruction from the operating terminal to the device, the first certificate revocation list and the second certificate revocation list relating to certificates of the controller and the device;
   determining, by the device, validity of the controller based on the first certificate revocation list and the second certificate revocation list; and
   determining, by the device, in accordance with a content of the control instruction, an execution order of the determination of the validity of the controller and control processing based on the content of the control instruction.

2. The authentication method according to claim 1, further comprising:
   disconnecting, by the device, connection between the device and the controller when it is determined that the controller is invalid.

3. The authentication method according to claim 1,
   wherein the validity of the controller is determined by comparing a next issue date of the first certificate revocation list with an issue date of the second certificate revocation list.

4. The authentication method according to claim 1,
   wherein the authentication system further includes a server,
   and wherein the server provides the second certificate revocation list to the control instruction.

5. The authentication method according to claim 1, further comprising:
   determining, by the device, in accordance with the content of the control instruction, whether or not to execute control processing based on the content of the control instruction.

6. The authentication method according to claim 1, further comprising:
   when the device determines that the controller is invalid based on the comparing, deleting registration of the controller from a management table.

7. An authentication system including a device, an operating terminal that operates the device, and a controller, where an authentication request from the device is authenticated by the controller,
   wherein the device
      acquires a first certificate revocation list from the controller,
      after the first certificate revocation list acquired, acquires a second certificate revocation list along with a control instruction from the operating terminal to the device, and
      compare the first certificate revocation list of the controller and the second certificate revocation list of the operating terminal for consistency,
   wherein the first certificate revocation list and the second certificate revocation list relate to certificates of the controller and the device,
   wherein the device determines validity of the controller based on the comparing of the first certificate revocation list of the controller and the second certificate revocation list of the operating terminal,
   wherein the device determines, in accordance with a content of the control instruction, an execution order of the determination of the validity of the controller and control processing based on the content of the control instruction, and
   wherein the operating terminal, the device, and the controller are separated from one another.

8. A device connected to the authentication system according to claim 7.

* * * * *